United States Patent [19]
Gweon et al.

[11] Patent Number: 5,483,391
[45] Date of Patent: Jan. 9, 1996

[54] METHOD OF AND APPARATUS FOR ADJUSTING DECK MECHANISM OF VIDEO CASSETTE RECORDER

[75] Inventors: Dae-Gab Gweon; Deockje Cho, both of Daejon; Jaeuk Ryu, Seoul, all of Rep. of Korea

[73] Assignee: Sam Jung Co., Ltd., Rep. of Korea

[21] Appl. No.: 118,423

[22] Filed: Sep. 8, 1993

[30] Foreign Application Priority Data

Sep. 9, 1992 [KR] Rep. of Korea ............... 92-16442
Mar. 16, 1993 [KR] Rep. of Korea ............... 93-3996

[51] Int. Cl.⁶ .................................................. G11B 15/60
[52] U.S. Cl. .................. 360/69; 360/137; 226/20; 226/21; 226/45; 226/199
[58] Field of Search ............................ 360/69, 71, 85, 360/95, 77.12, 77.13, 130.21, 137; 226/20, 21, 45, 179, 197, 199; 29/737, DIG. 28, 593

[56] References Cited

U.S. PATENT DOCUMENTS

| | | | |
|---|---|---|---|
| 4,367,487 | 1/1983 | Klein et al. | 358/107 |
| 4,582,235 | 4/1986 | Schulz | 226/20 |
| 4,760,945 | 8/1988 | Zerle | 226/20 X |
| 4,913,328 | 4/1990 | Schulz | 226/21 |
| 4,964,557 | 10/1990 | Sarkisian et al. | 226/21 X |
| 5,307,219 | 4/1994 | Haba | 226/199 X |
| 5,333,770 | 8/1994 | Kano et al. | 226/20 X |
| 5,341,256 | 8/1994 | Murata et al. | 360/75 |

*Primary Examiner*—Aristotelis Psitos
*Assistant Examiner*—James L. Habermehl
*Attorney, Agent, or Firm*—Peter L. Michaelson; John C. Polotylo

[57] ABSTRACT

An automatic deck adjusting apparatus having a tape running system adjusting mechanism for adjusting a VCR deck automatically and control means for controlling the adjusting mechanism to adjust the tape running system automatically. The tape running system adjusting mechanism comprises a plurality of screw driver tip assemblies for screwing adjustment screws and/or nuts in the system, a motor assembly for rotating the screw driver tip assemblies by a predetermined angle, a driver housing for fixedly supporting the screw driver tip assembly and the motor assembly in place, moving means attached to the driver housing for reciprocating the housing, a positioning means aligning the deck mechanism and the screw driver housing to be coincided in position with each other when they are coupled together and, a video camera for monitoring the position of the tape passing through guide posts and an audio/control head assembly or head drum. The control means comprises a main computer for controlling entire apparatus, a motor controller for controlling the motor assembly to rotate multiple driver tip assemblies by a predetermined angle under a control of the main computer, a position detector for receiving video signals from the video camera monitoring the position of the tape passing through the guide posts and the audio/control head assembly or the head drum, calculating the position of the tape on the posts and head assembly and informing the position of the tape to the main computer, a video signal processor for amplifying and detecting the video signal produced from a video head in the deck, obtaining an envelope waveform from the detected video signal and converting the envelope waveform to digital signal to be transferred to the main computer and, an audio signal processor for calculating an effective value of signal produced by an audio head in the deck, wherein the main computer controls the tape running system adjusting mechanism, the motor controller, the positioning detector the video signal processor, the audio signal processor and the control signal processor to adjust automatically the tape running system of the deck.

17 Claims, 27 Drawing Sheets

FIG. 13
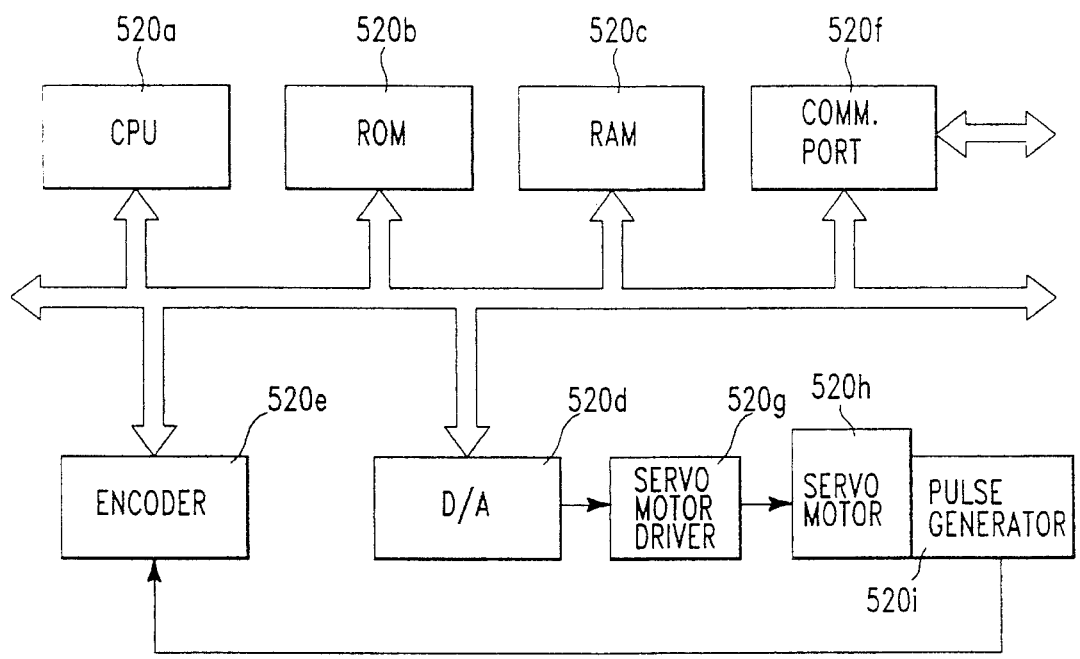
FIG. 14A
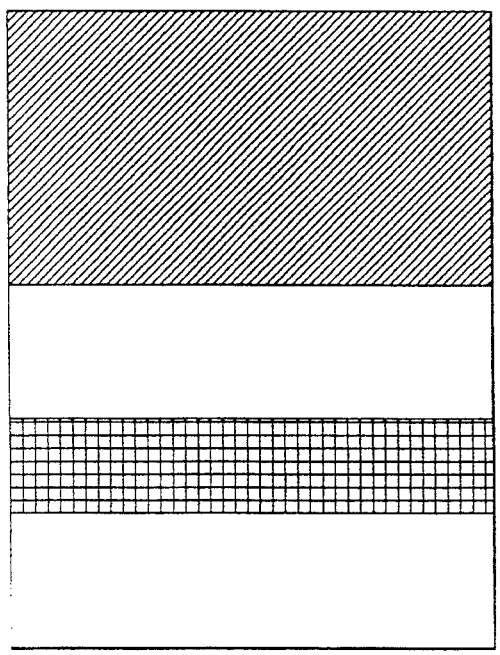
FIG. 14B
| 100 | 100 | 100 | 100 | 100 | 100 |
| --- | --- | --- | --- | --- | --- |
| 100 | 100 | 100 | 100 | 100 | 100 |
| 100 | 100 | 100 | 100 | 100 | 100 |
| 100 | 100 | 100 | 100 | 100 | 100 |
| 100 | 100 | 100 | 100 | 100 | 100 |
| 100 | 100 | 100 | 100 | 100 | 100 |
| 0 | 0 | 0 | 0 | 0 | 0 |
| 0 | 0 | 0 | 0 | 0 | 0 |
| 0 | 0 | 0 | 0 | 0 | 0 |
| 255 | 255 | 255 | 255 | 255 | 255 |
| 255 | 255 | 255 | 255 | 255 | 255 |
| 0 | 0 | 0 | 0 | 0 | 0 |
| 0 | 0 | 0 | 0 | 0 | 0 |
| 0 | 0 | 0 | 0 | 0 | 0 |

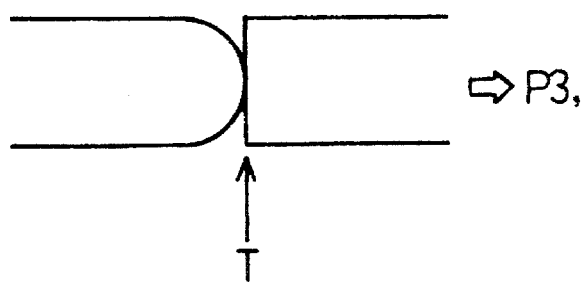
FIG. 33-(1) ⇨P3,
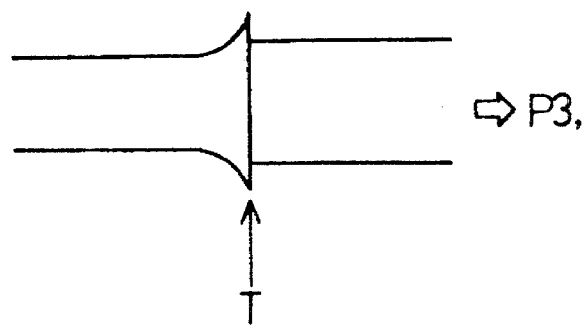
FIG. 33-(2) ⇨P3,
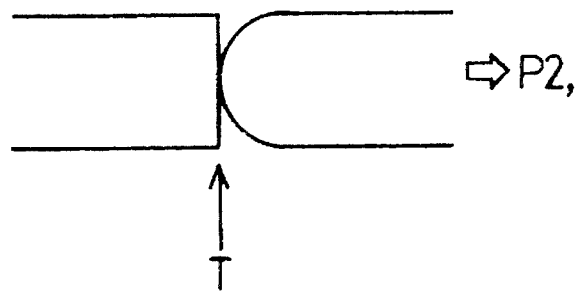
FIG. 33-(3) ⇨P2,
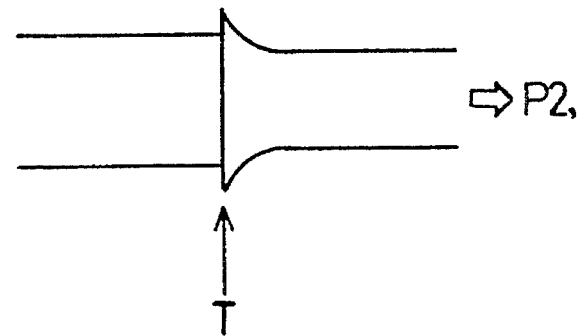
FIG. 33-(4) ⇨P2,

METHOD OF AND APPARATUS FOR ADJUSTING DECK MECHANISM OF VIDEO CASSETTE RECORDER

BACKGROUND OF THE INVENTION

1. Field of the Invention

The present invention relates to a method of and an apparatus for adjusting a video tape running system in a deck mechanism of a video cassette recorder (VCR).

2. Description of the Prior Art

In general, such a tape running system of a VCR deck mechanism is adjusted to accord a relative position between a video tape passing through the system and a head drum so as to obtain a good picture quality. An audio head and a control head which are employed in the system are also adjusted to obtain good audio-quality and control signal.

Referring to FIGS. 1 to 3, a process for adjusting such a conventional VCR deck mechanism is illustrated. In fact, a tape running system in a deck mechanism of a video home system (VHS) VCR includes several mechanical components or elements for defining a tape passway through which a video tape 120 runs from a supply wheel 112 to a take-up reel 114 in a video tape cassette 110, as shown in FIG. 1. More particularly, the video tape 120 is supplied from the supply reel 112 to the take-up reel 114 through a tape inlet-side limit post P1, a slant post P2, a head drum 130, a tape outlet-side slant post P3, an audio and control (A/C) head assembly 140 and a limit post P4. The video tape 120 is guided by several guide posts 121, 122, 123, 125, 126 and 129, and controlled in speed by a capstan 127 and a pinch roller 128. Besides, as components for defining a tape runway through which the video tape 120 runs in the tape running system, there are a tension arm, an erasing head and the like. In running of the video tape, it is likely to be affected by the position of each of the components which forms the tape running system.

Substantially, such components which must be adjusted include shaped into a "−" head screw 210 or cross-head screw 220, or a hexagonal nut 220 or square nut 240. The audio and control head assembly 140 has a hexagonal nut 142 for adjusting a height of the head and an azimuth nut 144 for controlling an angle of the head.

The tape running system requires following conditions in order to be correctly operated.

1. Height condition: a height of a central line of the video tape from a reference plane must be even from an outlet point of the cassette to the inlet-side slant post and from an outlet-side slant post to an inlet point of the cassette.
2. Parallelism condition: the video tape must be moved levelly on the tape runway course from an outlet of the cassette to an inlet-side slant post and from an outlet-side slant post to an inlet point of the cassette.
3. Twist condition: the tape must be prevented from being twisted between the respective tape guide members. That is, when the tape is cut in wide direction, the tension acting on each points of the cut tape edge must be uniformed.

For these reasons, the tape running system is adjusted by determining the mechanical positions of each components so as to satisfy the above-mentioned conditions. In a case of the adjustment of the tape running system, it is considered that each components are modelled properly and the system is mechanically analyzed. But, a deviation in such modelling or analyzing is to be occurred whereby the system may be adjusted unstably. Mainly, the tape running system is adjusted to be stabilized so that a video signal and an audio signal are recorded or reproduced onto or from the video tape satisfactorily. In fact, an accurate adjustment is checked by way of several measuring methods to determine the stabilization of the system. For such measuring methods, a test tape having a specific signal recorded thereon is used in the deck mechanism so as to determine that the signal obtained from the test tape is within a predetermined value.

Such measuring methods are as bellows:

* 2H test tape method:

A sinusoidal wave form signal having a constant frequency of approximately 4 MHz is recorded on a video signal area of the video tape and also a sinusoidal wave signal having a constant frequency and an amplitude is recorded on an audio signal area of the tape. Further, pulses of 30 Hz are recorded on a control signal area of the video tape to match a synchronism of the video signal. According to this method, such an adjustment is estimated on the basis of linearity of an envelope waveform obtained from the video signal and an amplitude of the audio signal.

** CTL test tape method:

A control pulse signal is recorded on a control signal area in a magnitude ratio of 1: 2 and a signal ratio between two peak points of the reproduced signal is checked to determine the adjusted state of the tape running system. An audio signal is also recorded to determine a suitability of the audio signal.

*** 6H test tape method:

This method is very similar to the 2H test tape in signal format. In the 6H test tape method, however, a signal is recorded under a triple-speed recording mode so as to check a suitable reproduction possibility of a video tape having a signal recorded thereon under a triple-speed recording mode.

As shown in FIG. 2, each of the P1, P2, P3 and P4 posts has a screw-head 210 oil which linear groove is formed except a central portion. A screw driver for driving the screw 210 has a shape, shown in FIG. 5 as indicated 340, corresponding to the screw 210 to be suitably fitted with the screw 210.

The audio and control head assembly has a height control nut 144 and an azimuth screw at the head is adjusted in height, and an height and azimuth adjustment are carried out by way of a hexagonal nut and the azimuth control screw, respectively. A degree of slant of the audio and control head is also adjusted by the height control nut.

In the adjustment of the tape running system, lower ends of the tape pass of the P1 and P4 posts are aligned with a height of 90 degree phase lead line of the head drum. An envelope waveform reproduced from the 2H test tape is displayed on an oscilloscope, and the P2 and P3 posts are adjusted to produce a smooth signal. Thereinafter, while reproducing the CTL test tape, the audio and control head assembly 140 is adjusted with the height nut 144 thereof to satisfy a signal ratio of 1: 2 and the azimuth control screw 142 do the audio and control head assembly is adjusted to obtain an audio signal is produced to a desired amplitude.

Next, the 6H test tape is reproduced in the triple-speed reproduction mode to check the condition of the audio and control head assembly adjusted. In this process, such adjustment can be perfectly completed over an additional adjusting process carried out by a skilled worker.

According to such a adjustment for a conventional tape running system, the posts P1, P2, P3 and P4, the audio and control head height control nut and the azimuth control screw are manually adjusted so as to achieve a good reproduction of a video signal, an audio signal and a control signal which form a VCR signal. As a result, in the conventional adjusting method, it is difficult to make an accurate and quick adjustment of the tape running system, and a quality in adjustment corresponds upon a degree of skill of a worker.

SUMMARY OF THE INVENTION

It is an object of the present invention is to provide an apparatus for and a method of adjusting a tape running system in a cassette deck automatically.

According to the present invention, an automatic deck adjusting apparatus have a tape running system adjusting mechanism for adjusting a tape running system and a control means for controlling the tape running system adjusting mechanism to adjust the tape running system of a deck mechanism in a VCR automatically.

The tape running system adjusting mechanism comprises a plurality of screw driver tip assemblies for screwing adjustment screws or nuts in the system, a motor assembly for rotating the screw driver tip assemblies by a predetermined angle, a driver housing for fixedly supporting the screw driver tip assemblies and the motor assembly in place, a means for moving the housing to adjusting position and to standby position, being attached to the driver housing, a positioning means for aligning a deck mechanism to be adjusted and the screw driver housing in an exact position with each other, and a video camera for monitoring the position of the tape passing through guide posts and an audio and control head assembly.

The control means comprises a main computer for controlling the entire apparatus, a motor controller for controlling the motor assembly to rotate a driver tip assembly by a predetermined angle under a control of the main computer, a position detector for receiving video signals from a video camera monitoring the position of the tape passing through guide posts and audio and control head assembly, calculating the position of the tape on the posts and head assembly and informing the position of the tape to the main computer, a video signal processor for amplifying and detecting the video signal produced from a video head in the deck, obtaining an envelope waveform from the detected video signal and converting the envelope waveform to digital signal to be transferred to the main computer, and an audio signal processor for calculating an effective value of signal produced by an audio head in the deck. The main computer controls the tape running system adjusting mechanism, the motor controller, the positioning detector, the video signal processor, the audio signal processor and the control signal processor to adjust the tape running system of the deck mechanism.

According another feature of the invention, the tape running system adjusting mechanism has a video camera for monitoring the position of the tape passing through guide posts and a position of a lead line of a head drum, and the control means has a position detector for receiving video signals from the video camera monitoring the position of the tape passing through the guide posts and the head drum, calculating the position of the tape on the posts and head drum, and informing the position of the tape to the main computer. And the main computer controls the tape running system adjusting mechanism, the motor controller, the positioning detector the video signal processor, the audio signal processor and the control signal processor to adjust the tape running system of the deck.

According to the present invention, a method of adjusting a tape running system by using an automatic tape running system adjusting apparatus of the present invention, includes the steps of (a) checking the arrival of a deck to be adjusted to a working position and contacting the deck with a deck adjusting mechanism moved downward, (b) adjusting a P4 post and then adjusting a height control nut of an audio and control head assembly, adjusting .an azimuth control screw, and adjusting the height control nut of the audio and control head assembly and the azimuth control screw simultaneously, (c) adjusting the P2 and P3, checking the value of every signal to be in a predetermined range, the deck having signals defined within the range being determined as "passed" and/or "failure".

Another aspect of the present invention, a method for adjusting a tape running system by using an automatic tape running system adjusting apparatus comprises the steps of (a) checking that a deck to be adjusted is arrived to the working area and if the deck being reaches to the working area, moving down the deck adjusting mechanism down to couple with the deck arrived, (b) rotating a driver clockwise or anti-clockwise by 180 degree to conjoin the driver tip head and the screw head or nut, (c) measuring the height of a lead line of a head drum at 90 degree of phase to adjust approximately the height of P1, P2, P3 and P4 posts, (d) measuring the height of the lower side of the P1 and P4 posts by using the image of video camera, comparing the height with the height of the lead line of the head drum at 90 degree of phase, rotating the P1 and P4 posts to be accorded with the lead line height, (e) measuring the gab between the lower side of the tape at the inlet and outlet of the head drum and the lead line and adjusting the P2 and P4 posts so that the gab is to be 0, (f) adjusting P2 and P4 posts such that a linearity LT of the envelope waveform of the video signal taken from video head is to be larger than. the reference value, (g) adjusting an a/c head height control nut to control a peak value of a control signal produced by a control head to be larger than the reference value, (h) adjusting the azimuth screw so that the effective value RMS of audio signals from an audio head is to be larger than the reference value, (i) measuring each of the signals again after the completion of the process of the steps (a) to (h) and comparing the signals with the respective reference value, wherein if the all of the measured values satisfy the reference values, then "passed" is indicated; whereas, if the values do not satisfy the reference values, "failure" is indicated.

The above and other objects, features and advantages of the invention will be apparent from the following description taken with reference to the accompanying drawings.

BRIEF DESCRIPTION OF THE DRAWINGS

FIG. 13 is a block diagram of a motor controller;

FIG. 14 is for illustration of a video image process in a position detecting function;

FIG. 20 (B) is a plane view of FIG. 20 (A);

FIG. 22 (B) and (C) are wave forms of the audio signals

FIG. 33 is for explaining a method of analyzing an envelope waveform;

DETAILED DESCRIPTION OF THE PREFERRED EMBODIMENTS

A preferred embodiment of the present invention will be described in detail with reference to the accompanying drawings.

Figure 4:
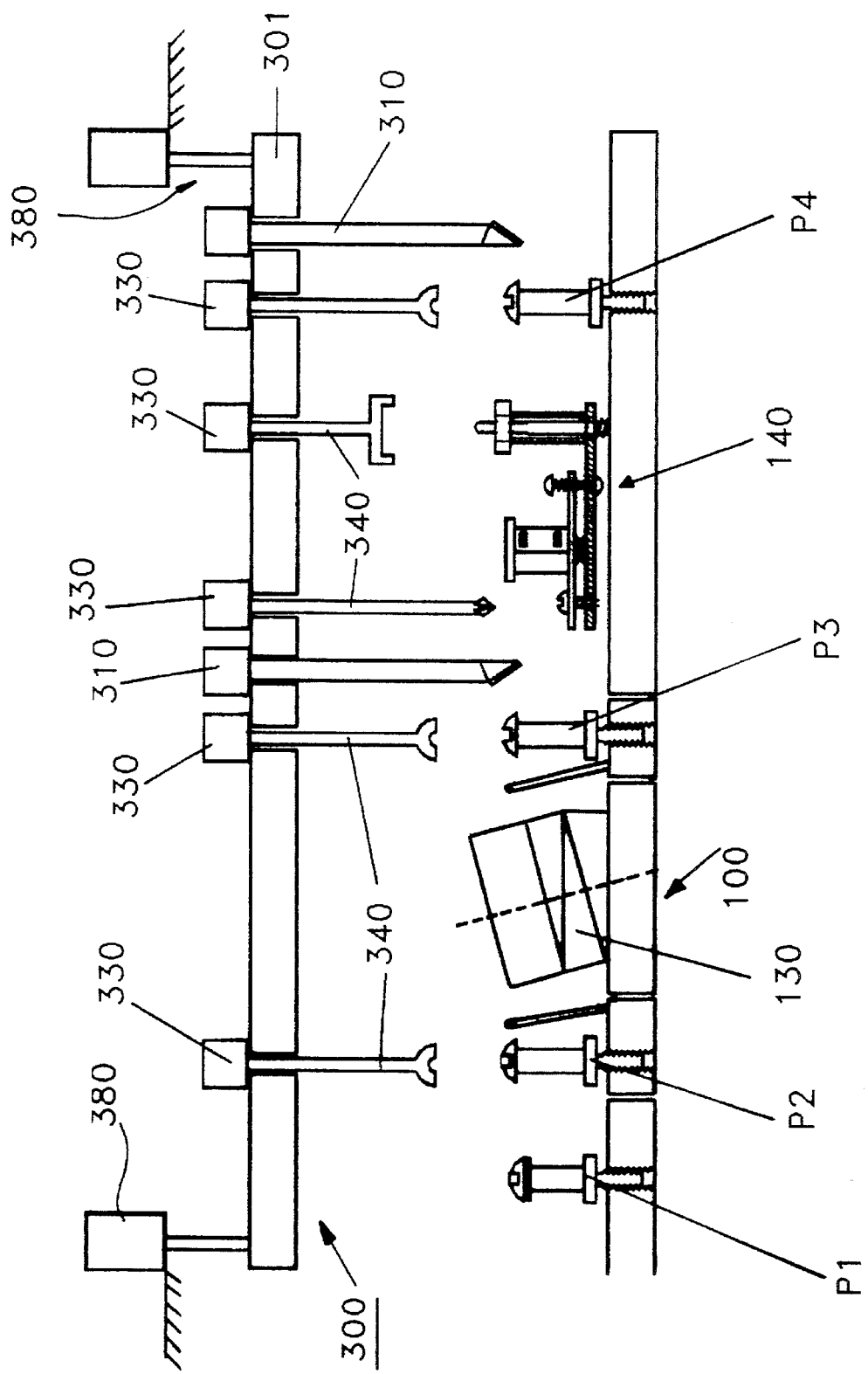
FIG. 4 is a schematic side view and partial sectional view illustrating a conjoined relation of a tape running system adjusting mechanism to a tape running system of a deck mechanism according to a preferred embodiment of the present invention.

In FIG. 4, a tape running system adjusting mechanism 300 of the present invention is illustrated as a model for convenience of the description to the interconnection relation of the mechanism 300 and adjusting points. The mechanism 300 has screw driver tip assemblies 340, motor assemblies 330, driving units 380, video cameras 310 and etc, which are mounted on a base substrate 301. The mechanism 300 is moved downward so that the screw driver tip assembly 340 are mutually contacted with the adjusting points of the tape running system in the deck, and the video cameras 310 locate near the P4 post and audio and video (a/c) head.

Figure 5:
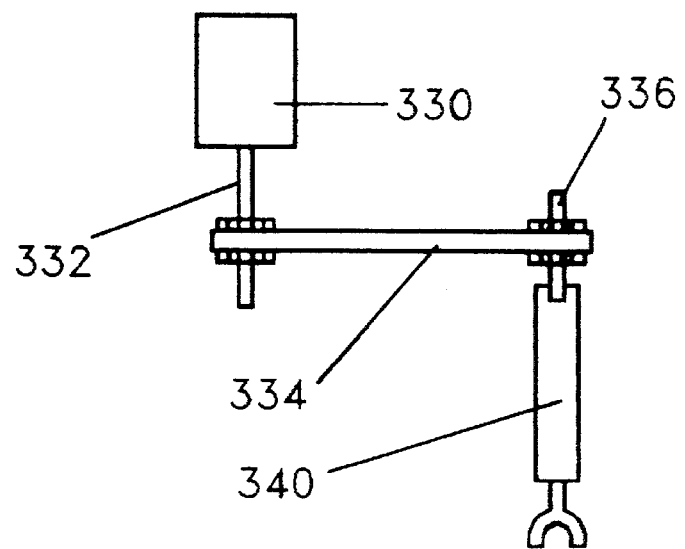
FIG. 5 is a schematic view illustrating a power transmission relation from a motor assembly to a driver tip assembly of the present invention.

FIG. 5 illustrates a power transmission arrangement for screwing the respective adjusting points in the deck mechanism. The power produced from the motor assembly 330 is transferred to the screw driver tip assembly 340 via a driving shaft 332, a timing belt 334 and a driven shaft 336.

Figure 6:
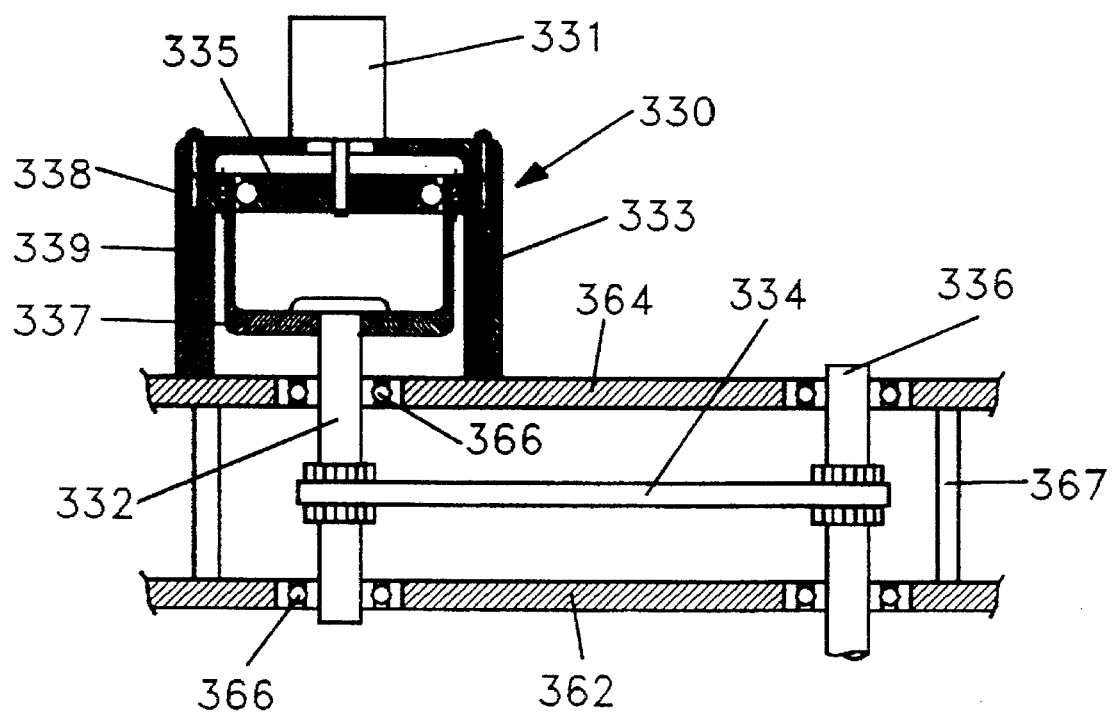
FIG. 6 is a partial sectional view illustrating the motor assembly coupled to a driver housing.

Referring to FIG. 6 showing a partial section of the motor assembly, this assembly 330 is conjoined to the driver housing 360. The rotation force of a motor 331 is transferred to the driving shaft 332 through a wave generator 335 and a flex spline 337 and then transferred to the driven shaft 336 through the timing belt 334. The motor assembly 330 produces driving force required to drive the driver tip assembly 340 under a control of control unit, and comprises a DC servo motor and the power transferring members. Application of the DC servo motor allows to assure a high driving force as well as a fine position control. The DC servo motor may be substituted by a stepping motor. The harmonic driver having a ratio of 50:1 in reduction of rotation is preferably employed so as to increase a torque. In the reduction gear or speed reducer proposed heretofore, this embodiment employs a harmonic driver in which the flex spline 337 is rotated one turn (Ratio of 1/50) when the wave generator 335 connected to the motor shaft, namely, the driving shaft 332 is rotated 50 turns.

As shown in FIG. 6, housings 362 and 364 are prepared such that a casing 339 of the harmonic driver fixed with the motor and the circular spline 338 is suitably mounted on the upper plate 364. The driving shaft 332 is connected fixedly to the flex spline 337 and also rotatably coupled to the housing 360 by way of two bearings 336. In the construction described above, the rotation force of the driving shaft 332 is transferred to the driven shaft 336 which is connected with the screw driver tip assembly 340 by way of the timing belt 334. Substantially, since the adjusting points are densely located within narrow space in the deck mechanism, it is difficult to connect directly the motor to the reduction gear shaft and the screw driver shaft. For this reason, the power transmission is designed such that the driven shaft 336 for driving the screw driver is spaced away from the driving shaft 332 of the motor assembly by way of the timing belt 334.

The driver housing 360 is provided with the upper plate 364 serving as a motor plate and a lower plate 362 serving as a pulley plate in order to support the power transmission. The housing is connected with the motor assembly and the power transmission for adjusting the P2, P3 an P4 posts, the height control nut, and azimuth control screw of the A/C head assembly.

Figure 7:
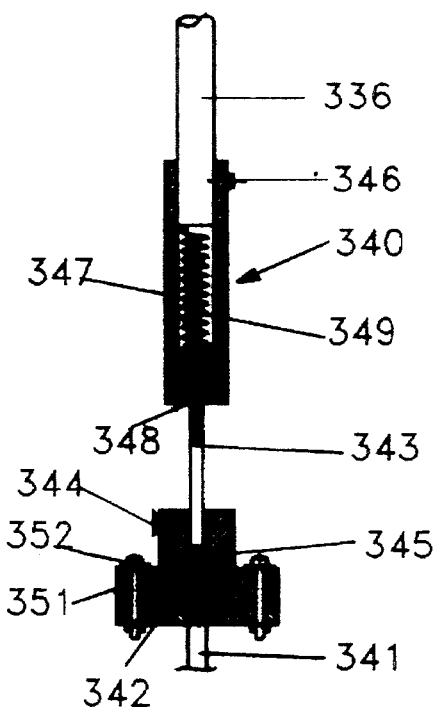
FIG. 7 is a schematic cross-sectional view of a driver tip assembly.

In FIG. 7, the screw driver tip assembly 340 is illustrated. Generally, each adjusting points has a positional error relative to corresponding reference point. In order to position the screw driver tip onto correspond adjusting point, therefore, it is required to overcome the position error in a process of fabricating the deck mechanism. Thus, a flexible shaft coupling is used to make the screw drive tip easily moved in a horizontal direction. Furthermore, a Z-directional resilient spring is disposed such that the screw drivers press the screw heads properly when the screws are adjusted. The power of the screw driver tip assembly is transferred from the motor, through the driving shaft, the driven shaft and the screw driver tip assembly in that order.

The driver tip assembly 340 is constituted such that a flange 342 formed on a driver tip is coupled to a spline shaft flange 345 connected to a spline shaft 343, the spline shaft flange 345 has a screw hole 351 being formed smaller than a screw 352 head but larger than a screw axis in order for the drive tip to be suitably set at a appropriate position. The spline shaft 343 is inserted into a spline hole 348 of a connecting tube 347 connected to a driven shaft 336 with a set screw 346 so as to transfer the rotation of the driven shaft 336 to the screw driver tip 341, and a spring 349 is disposed between the driven shaft 336 and a head of the spline shaft 343 to provide a pressure in rotating the screw driver tip. As shown in FIG. 7, a flange which is formed in the screw driver tip 341 is fastened tea spline shaft flange 345 by way of a screw 352 and the spline shaft flange 345 is joined with a spline shaft 343 by a set screw 344. The spline shaft flange 345 is formed with a screw hole having a diameter smaller than the screw head and larger than the screw axis, so that the flange 345 can move by a predetermined length in the horizontal direction. The spline shaft 343 is inserted into a spline hole 348 of a joint tube 347 which is fastened to the driven shaft 336 by means of a set screw 346 and transfers the rotation of the driven shaft 336 to the screw driver tip 341.

The operation of the screw driver tip 341 is effected under a predetermined level of pressure and each of the posts is changed in height while rotating the posts. Accordingly, a spring 341 is inserted between the driven shaft and the spline shaft head to prevent the posts from being changed in height.

The driver housing 360 partially shown in FIG. 6 serves to fixedly secure the power transmission, the motor assembly and the screw driver tip assembly.

The driver housing has the upper and lower plates which are connected to each other by means of spacers 367. On the upper plates 364 serving as the motor plate, the motor, the reduction gear, the CCD camera and the power transmission are located between the upper plate and the lower plate 362 serving as the pulley plate, below which the screw driver tip assemblies are suspended.

Figure 8:
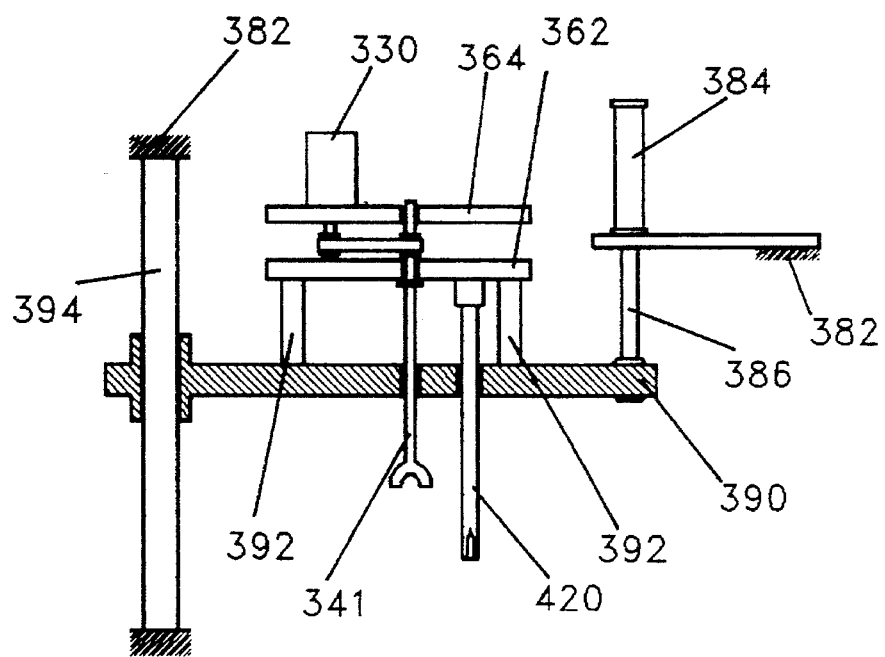
FIG. 8 is a schematic side view and sectional view of some part illustrating a moving unit.

By the moving unit 380 schematically shown in FIG. 8, the driver housing is moved downward to adjust the tape running system. After the adjustment of the system, the drive housing is lifted up so as to move a pallet having the deck loaded thereon along a conveyer to a working position. According to a construction of the moving unit 380, an operating rod 386 of an pneumatic cylinder 384 which is located on a fixing base 382, is coupled to a medium plate (a hatched one in FIG. 8) 390 which is attached to the pulley plate 362 of the driver housing with four rubber rods 392. In addition, four stand posts 394 (only one of them is shown for simplicity of the drawing) are fitted to the fixing base 382 so as to guide the medium plate 390 to be linearly moved upward and downward. The medium plate 390 is coupled slidably to the posts 394, and thus moved upwardly and downward.

As the pneumatic cylinder, a double operating-type pneumatic cylinder may be employed. The pneumatic cylinder of the present invention has a cushion which serves to reduce a speed at a lower dead point so as to assure a correct position of a positioning unit and the driver tip, as will be described later.

Further, the rubber rods 392 are used to connect the medium plate 390 and the driver housing to absorb a deviation in position between the pallet (412 shown in FIG. 9) and the positioning unit attached to the driver housing.

The cylinder is disposed on the upper plate of the fixing base 382. In the construction described above, the medium plate 390 is moved upward and downward by operation of the cylinder to move the driver housing upward and downward.

In the drawings, a construction of the motor assembly, the pneumatic cylinders, the screw driver tip assembly, the positioning unit, etc are illustrated for the simplicity, respectively.

Figure 9:
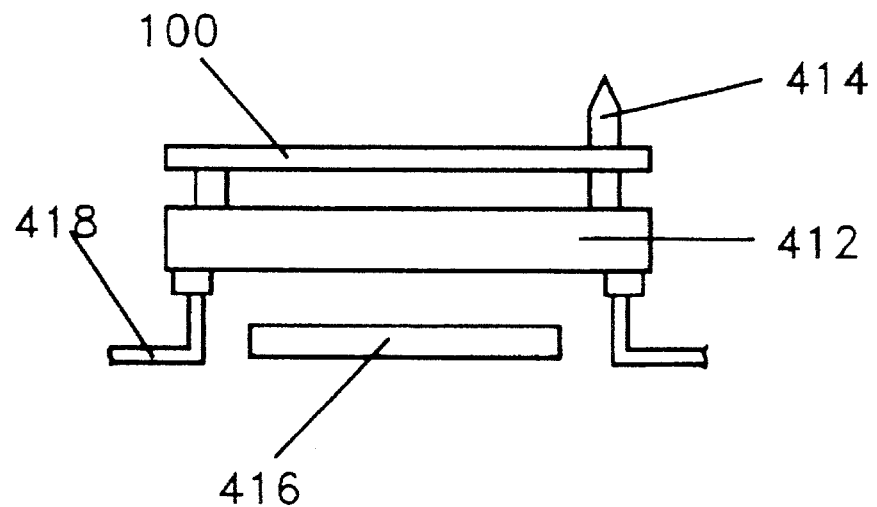
FIG. 9 is a schematic side view illustrating a positioning unit.
Figure 10:
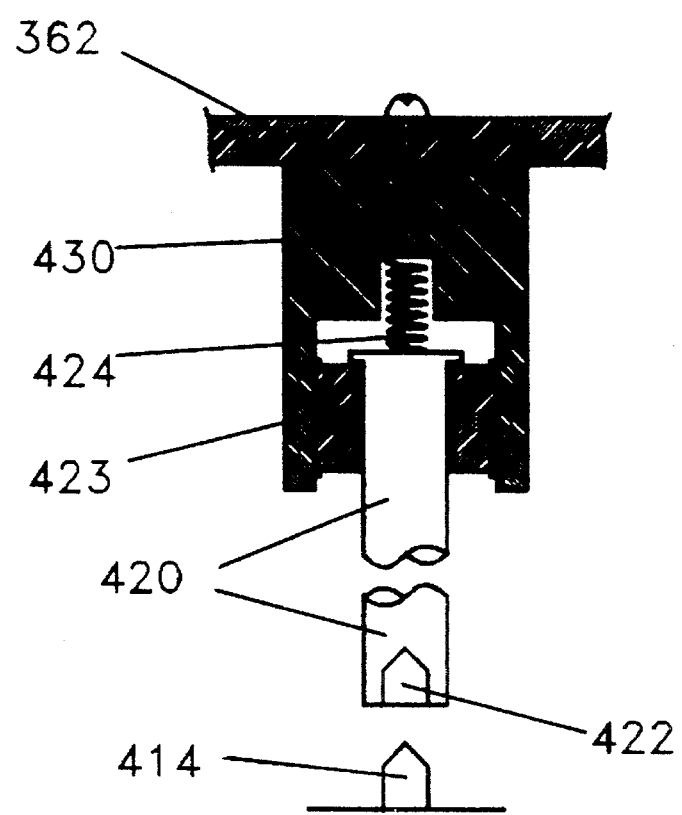
FIG. 10 is a schematic cross-section view illustrating the positioning unit.

The positional error of the VCR deck mechanism itself can be corrected by a horizontal compliance of the screw driver tip assembly as described previously. Referring to FIGS. 9 and 10 schematically showing the positioning unit, the palette having VCR deck loaded thereon moves along a conveyer belt 416, and is lifted upward from the adjusting position by a fixture 418. When the deck is coupled with the adjusting mechanism, an undesirable positional error is occurred. From this reason, the positioning unit is arranged to the driver housing and the palette in order to accord the deck and the driver housing in position. This can be achieved by using conic poles 414 (two conic posts located in the palette) which are used to fix the deck 100 to the palette.

The positioning unit has the upper guide 420 having a groove 422 formed at the center thereof attached to the pulley plate 362 a lower guide 414 serving as a conic post. The upper guide 420 is connected to a spring 424 as a resilient member through a ball bush which is disposed in the guide housing 430. The spring 424 absorbs a impacts from the conic posts to the driver house.

The positioning unit operates such that after the deck is fixed to the palette, the driver housing is descended by the moving unit. The positioning unit is firstly moved downward and positioned correctly, then the screw drivers are contacted with the respective adjustment points of the mechanism.

According to the present invention, when the entire devices such as the motor assembly, the power transmission, the screw driver tip assembly, the positioning unit and the like, which are connected to the driver housing (the motor plate and the pulley plate) of the tape running system adjusting mechanism are descended to fix the drive tip and the camera to the adjusting points and the respective site, the error occurred between the deck and the driver housing can be removed by way of the operation of the positioning device. More particularly, while the devices are descended, the conic post is inserted into the groove of the upper guide of the positioning unit to thereby be positioned correctly.

According to the present invention, it is preferably adopted that several positioning units are employed to the tape running system adjusting mechanism. Four guide posts and two pneumatic cylinders are used to absorb impacts in up and down movement of the driver housing and that in a relative movement between the positioning device and the deck. The medium plate 390 is moved downward along the guide posts by way of an air pressure of the pneumatic cylinder and the impact of relative movement of the positioning unit is absorbed by the four rubber rods.

Figure 1:
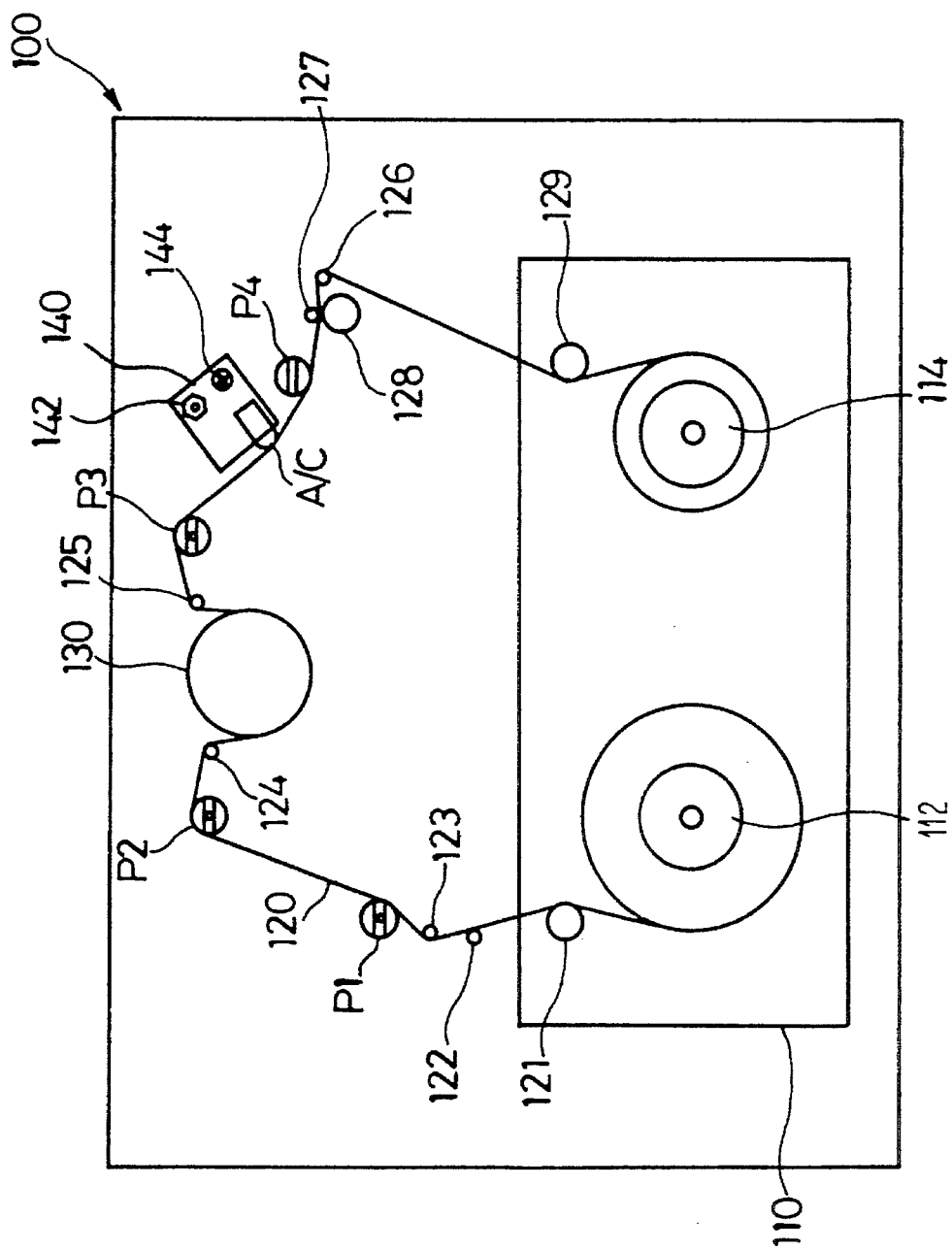
FIG. 1 is a schematic view illustrating a tape running system in a conventional deck mechanism, viewed from the upper side thereof.
Figure 2:
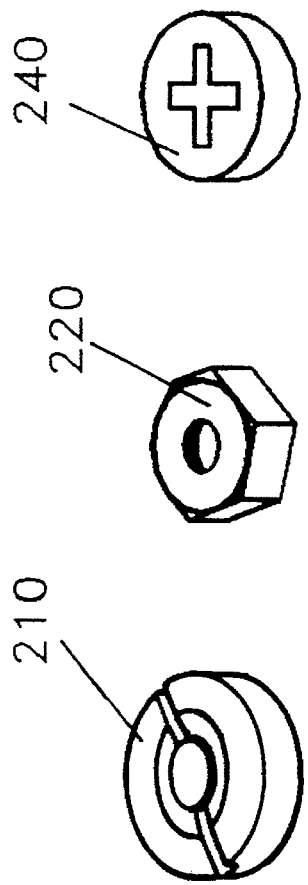
FIG. 2 is a perspective view showing screw heads as adjusting points in the deck mechanism.
Figure 3:
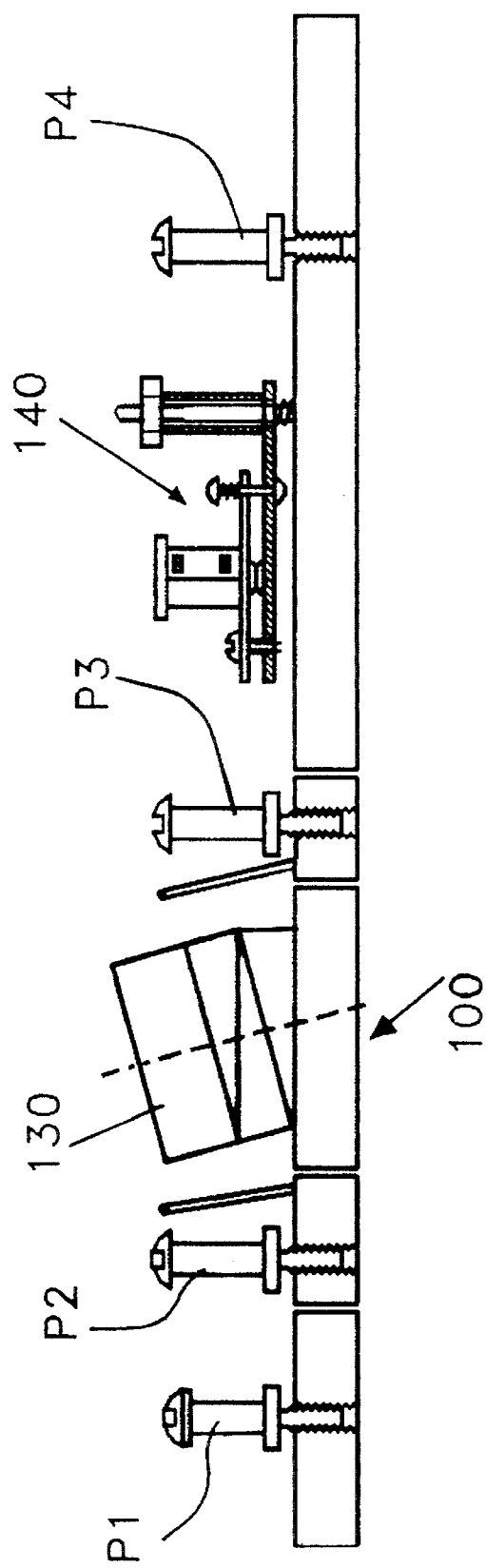
FIG. 3 is a schematic view and partial sectional view illustrating the tape running system, viewed from the side of thereof.

The video camera shown in FIG. 3 is employed to adjust the lower height of the posts P4 and monitors the lower height of the tape on the audio and control(a/c) head assembly. The video camera has a CCD element as an image sensing device and transfers the video signal to a position detector of a control unit for processing the signal properly and monitoring the position of the tape.

In this case, an optical path from the CCD camera mounted on the motor plate to an object (the lower end of the post, the lower side of the tape) is very narrow and is set in a vertical direction. Accordingly, an optical system is properly disposed on the optical path between the CCD camera and the object.

Also, in order to obtain a desired resolution, it is required that resolution per a pixel has to be set above at least 10 micro-meter. According to the present invention, a magnifying lens having the focal distance of 75 mili-meter is employed therein.

When the distance is set from the lens to an image screen (the image pick-up device in a case of the CCD camera) to satisfy the following equation, an image can be formed on the image screen. That is, $1/p + 1/q = 1/f$
where, "f" denotes the focal distance or focal length, "p" denotes a distance from the lens to the object and "q" denotes a distance from the lens to the screen.

Assuming that f=75 mm and p=200 mm, q becomes 120 mm by the equation.

At this time, the magnification ratio k becomes 0.6 from the following equation.

$$K = f/(p-f) = 0.6$$

Accordingly, when the dimension of the image sensor of the CCD camera is ½ inch and the numbers of the pixels is 512, the resolution R per a pixel is obtained by the following equation. That is, $R = 12.7/K \times 512 = 41.3$ m/pixels.

Thus obtained resolution R satisfies about 10 micro-meter of a desired minimum resolution.

Figure 11:
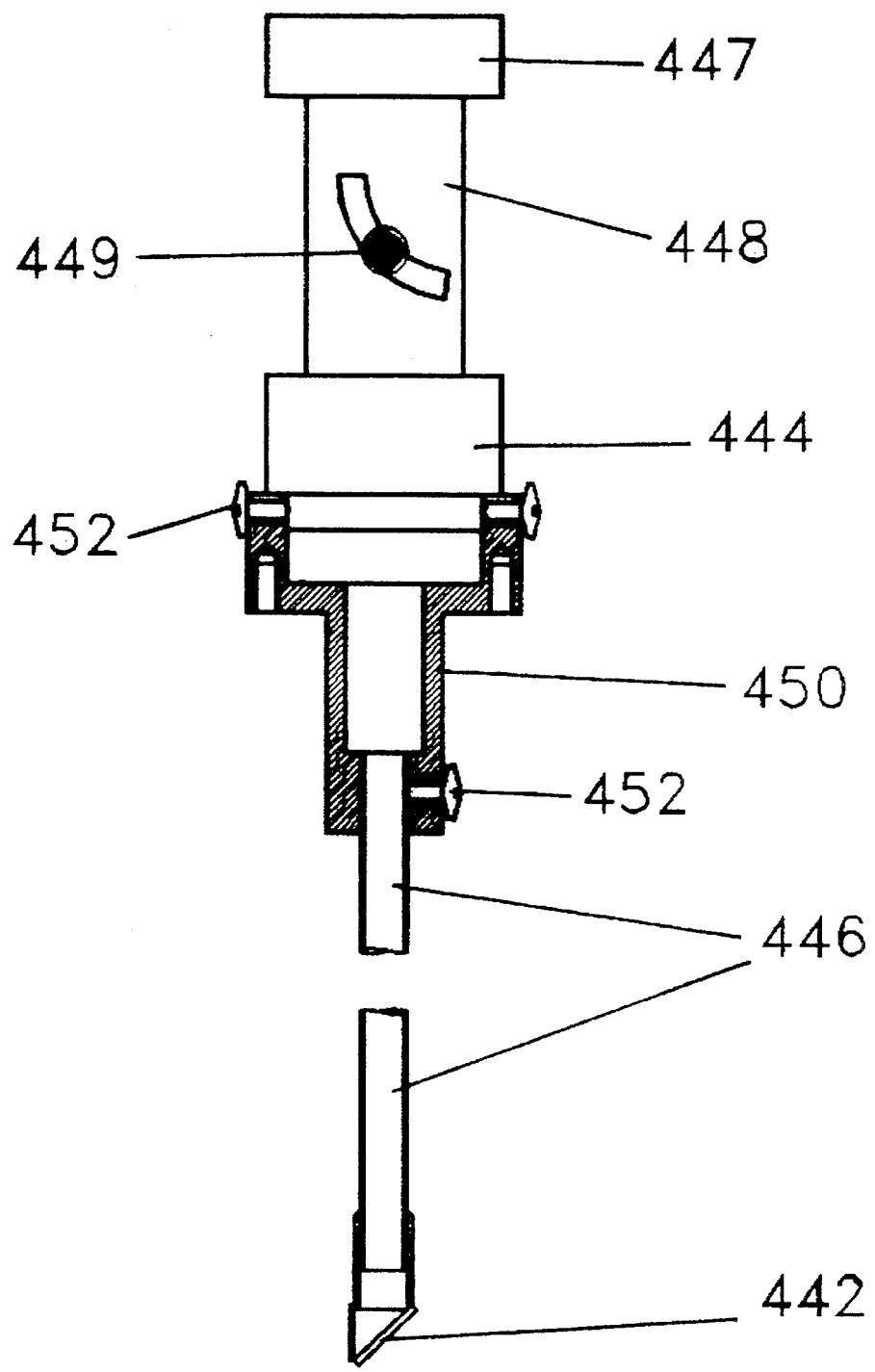
FIG. 11 is a partial cross-sectional view illustrating a video camera.

Referring to FIG. 11 schematically showing the entire optical system, a mirror 442 serves to set an optical path vertically and is coupled with the magnifying lens 444 by way of a pipe 446 and a lens coupler 450. A mirror case 448 connects the magnifying lens 444 and the CCD element 447.

The length of the mirror case 448 (that is, the length between the CCD element and the lens) can be adjusted by using a length adjustable knob 449 to allow an image to be formed on the image forming element correctly.

The mirror case 448 has a double structure, that is, an inner case connected with the length adjustable knob 449 and the magnifying lens 444. An external case connected to the CCD element 447 which is fixed at an end thereof. The mirror direction is controlled so that the image is formed in a desired direction. In the drawing, reference numeral 452 denotes screws.

Figure 12:
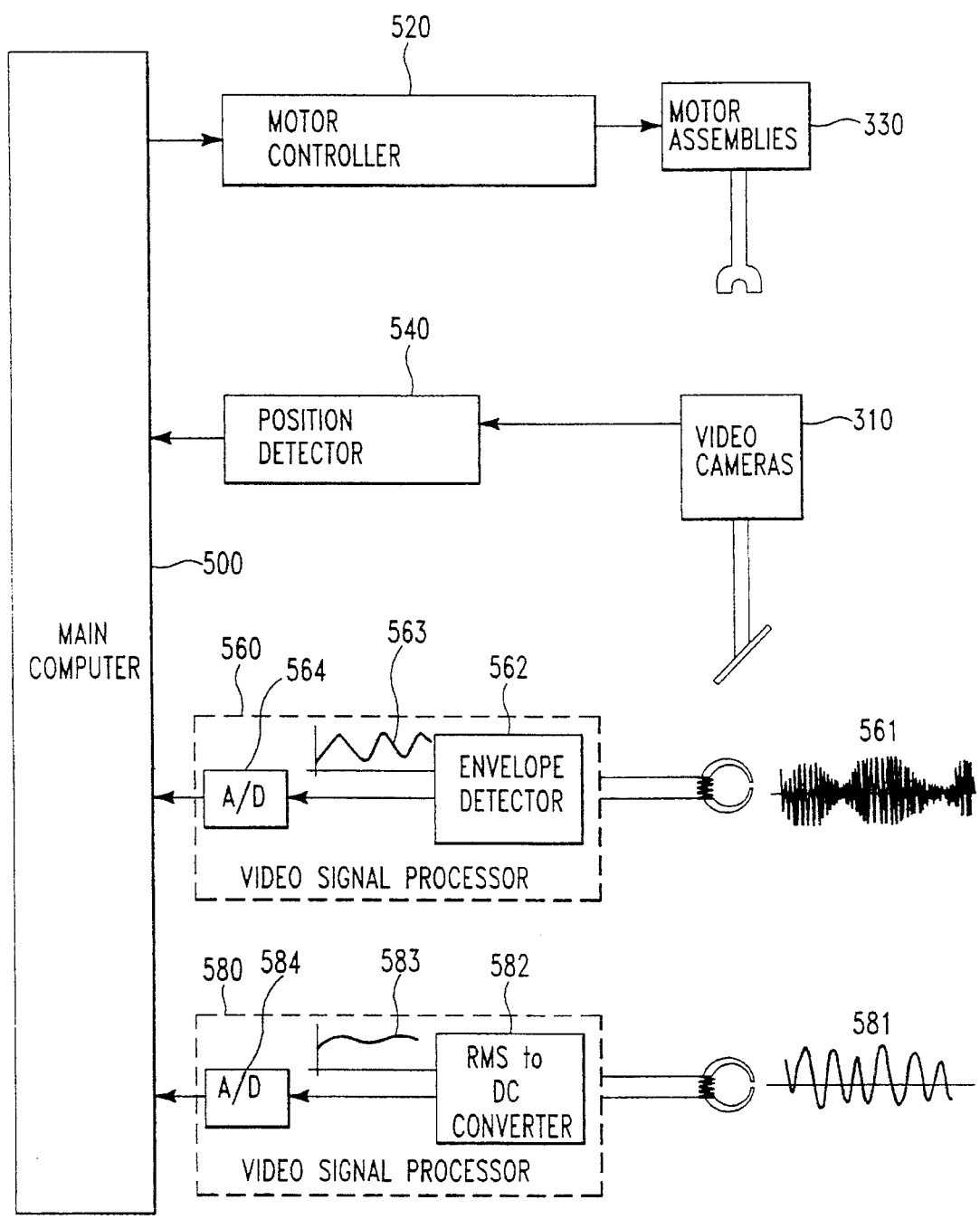
FIG. 12 is a block diagram of a control unit.

As shown in FIG. 12, the control unit (control means) includes a main computer 500, a motor controller 520, a position detector 540, a video signal processor 560, and an audio signal processor 580, and controls the entire deck adjusting process. More particularly, the control unit receives a video signal and data related to the video and audio signals representing the position of the tape positioned on the post P4 and the audio/control head assembly from the video camera, and controls the motor for the screw driver tip assembly such that the video, audio, and control signals are to be within predetermined range and the deck adjusting process is performed continuously.

As shown in FIG. 13, the motor controller 520 includes a data bus, a CPU 520a, a ROM and RAM 520b and 520c, a digital to analog converter 520d, an encoder 520e, a communication port 520f, a servo motor driver 520g connected to the digital to analog converter 520d, the servo motor 520h connected to the servomotor driver 520g and a pulse generator 520i connected to the servo motor 520h and, in turn, connected to the encoder 520e at signal output side thereof, connected each other via the data bus.

In the construction of the motor controller, the CPU 520a receives a motor control instruction from the main computer 500 in the controller through the communication port 520f and analyzes the instruction by a program and data previously stored in the ROM 520b and RAM 520c. As a result, the CPU 520a produces a digital motor control signal which in turn is supplied to the digital to analog converter 520d. The converter 520d converts the digital motor control signal into an analog signal which is subsequently amplified by the servo motor driver 520g. Then, the motor 520h rotates by the amplified control signal and the screw driver tip assembly connected to the motor 520h is also rotated. Accordingly, pulses proportional to the rotated angle of the motor 520h are produced by means of the pulse generator 520i and supplied to the encoder 520e which counts the number of the pulses and converts the counted pulse into a parallel signal. Thereinafter, the CPU 520a determines whether the motor 520h, particularly, the screw driver is rotated by a desired angle, on the basis of the parallel signal supplied from the encoder 520e.

The positioning detector 540 captures an image of the tape guided by the audio and control head assembly and an image of the tape guided by the post P4, and enters the tape position data to the main computer. This function of the position detector is carried out by so-called a frame grabber, which is mounted on the expanding slot of the main computer and converts the analog video signals into digital signals, and by a central processing unit for data processing. The data processing is carried out by the main computer 500, but it is also possible to adopt another micro-processor. The position detector converts the video signal from the CCD camera into a digital signal so as to obtain a brightness signal of a frame of the picture image (for example, 512×512 pixels). For instance, the position detector receives the video image, such as shown in FIG. 14A, from the video camera and detects the position of the post and tape, which is transferred to the main computer 500. In this case, each of the pixels takes a value in the range of 0 to 255. If an image as shown in FIG. 14A is obtained under a proper lighting, then the values stored and sampled by the frame grabber can be mapped as shown in Fig. 14B. At this time, the position of the lower side of the tape can be detected by checking any column of data and finding interfacing portions where the data values are changed from 100 to 0, from 0 to 255, and from 255 to 0. In fact, the brightness of the image is uneven, as described above. Accordingly, a thresholding process is carried out by taking 80 as a reference value and a mapping processing is then effected by taking the value larger than the thresholding value (i.e., 80) as 1 and the value lower than the thresholding value as 0 so as to detect the lower side of the tape. Each of the points to monitored is processed by using a proper thresholding value.

The position detector 540 has a tape position detectors in the audio and control head assembly, which produces the tape position data by processing the image of the tape guided by the audio and control head assembly and a tape position detector in the post P4, which produces the tape position data by taking the image of the tape guided by the post P4.

Figure 17:
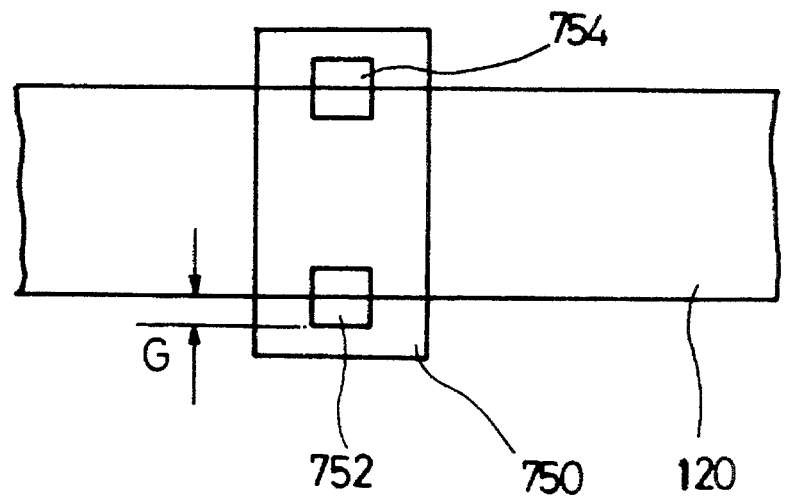
FIG. 17 is a view for explaining the relation between a tape and an audio/control head assembly.

Now, the operation of the tape position detector in the audio and control head assembly will be described with reference to FIGS. 17, 18 and 19. First, as shown in Fig. 17 when the tape 120 passes through an audio head 754 and a control head 752, a gap "G" is defined between the lower side of the control head 752 and the lower side of the tape 120.

Figure 18:
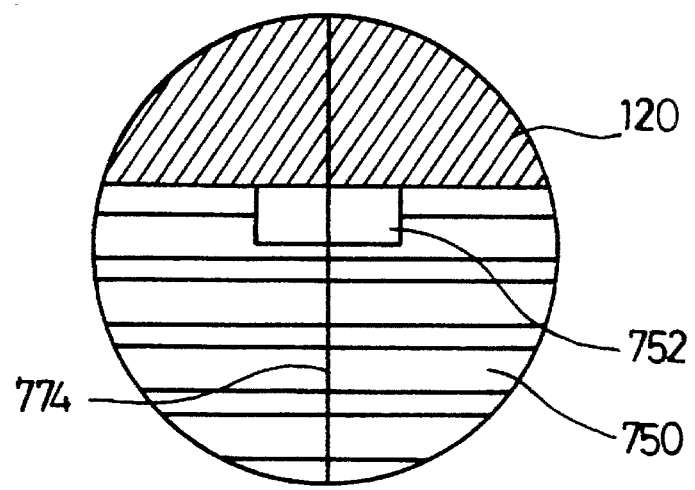
FIG. 18 is a view partially showing the video image for measuring the position of the tape and the control head.
Figure 19:
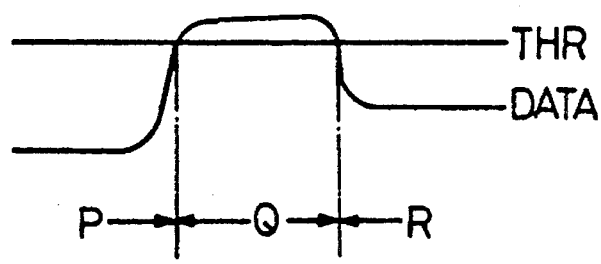
FIG. 19 is a waveform of a position measure signal taken along a sampling line in FIG. 18.

FIG. 18 illustrates an one example of an image of a portion near the gap G taken by the camera. As known in FIG. 18, brightness of the control head 752, the tape 120 and a substrate 750 of the audio and control head assembly is different. FIG. 19 shows the pattern of the waveform taken along a sampling line 774 in FIG. 18. In FIG. 19, "Q" denotes a signal representing the control head 752, "P" denotes a signal of the tape 120, and "R" denotes the substrate 750 of the audio and control head assembly. When this waveform shown in FIG. 19 is compared with a predetermined threshold value "THR", a length of the portion Q indicate the gab G. In the CTL tape test, adjusting the height control nut to accord the control signal ratio of 1:2 results in that the gap G between the lower side of the tape 120 and the lower side of the control head is to be at a predetermined distance, for example, 0.5 mm. Therefore, the height of the audio and control head can be adjusted with the processed data obtained from the video camera without analyzing the control signal of the a/c head.

As explained above, the brightness signal is processed by taking an image near the control head 752 and effecting a data acquisition along the data sampling line 774, and the gap "G" is detected by following steps.

(1) Find a maximum value MAX
(2) Threshold=MAX−E (where, E is a constant)
(3) Find data larger than the threshold value and measures the width of the data as a "G". As a result, the gap G between the lower side of the tape 120 and the lower side of the control head 752 can be measured.

Next, the function of the tape position detector in the post P4 will be described with reference to FIG. 20. Preferably, the lower side 780 of the P4 post must be extremely closed to the lower side of the tape 120. The position of the tape 120 is detected by spot lighting a predetermined point 786 by means of a lighting source 782 and comparing the strength of the reflected light by means of an optical inlet 784 of the video camera 310 disposed at a position where the light is reflected from the tape 120. The P4 post has a radially expanded jaw 780 which supports the lower side of the tape 120. The jaw 780 must be prevented from being departed from the end of the tape 120 and the tape 120 must be prevented from being pushed upward. In a case that the tape 120 is pushed upward, the lower side of the tape 120 is furled to be thereby damaged.

Figure 20A:
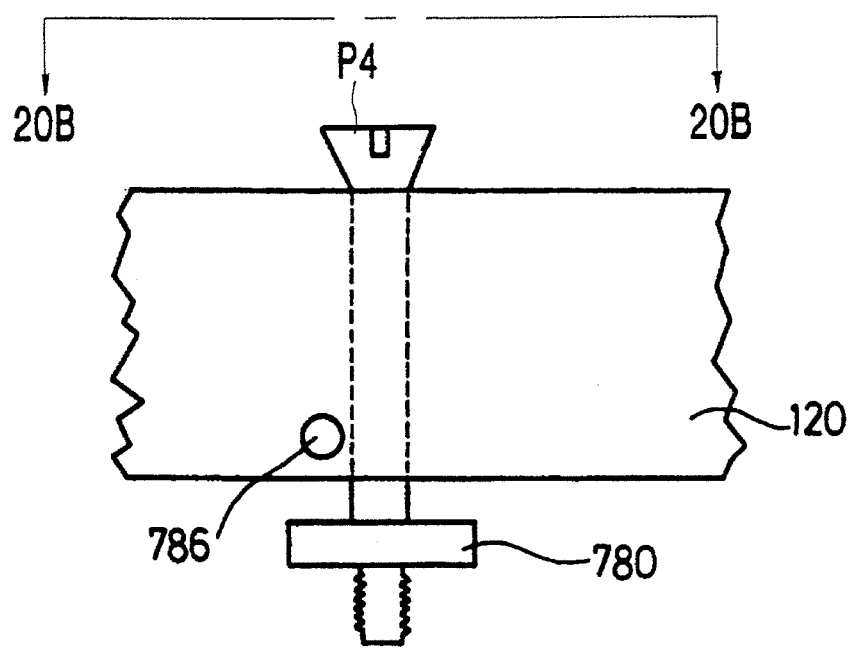
FIG. 20 (A) is a side view illustrating a lighting source and the video camera for monitoring the position of the lower end of a P4 post and the tape.
Figure 20B:
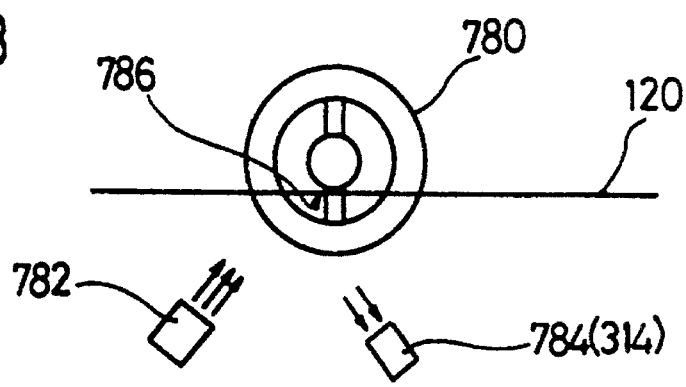

If the lighting source 782 is provided for detecting the position of the tape, as shown in FIG. 20 (A), the light reflected at point 786 is directly entered to the video camera 310. Thus an area near the point 786 shins brightly. if the P4 post is raised, the lower portion of the tape may be furled by a raising force of the jaw 780, then the reflection angle on the tape 120 is changed and the brightness near the point 786 is decreased. With this change of the brightness at the point 786 the P4 post can be adjusted.

In the video signal processor 560, the video signal 561 produced by the video head of the head drum is amplified and detected by an envelope detector 562 which outputs an envelope waveform 563. The envelope waveform 563 is digitally converted by the analog to digital converter 564. The digital signal in the video signal processor 560 is supplied to the main computer 500.

Figure 15:
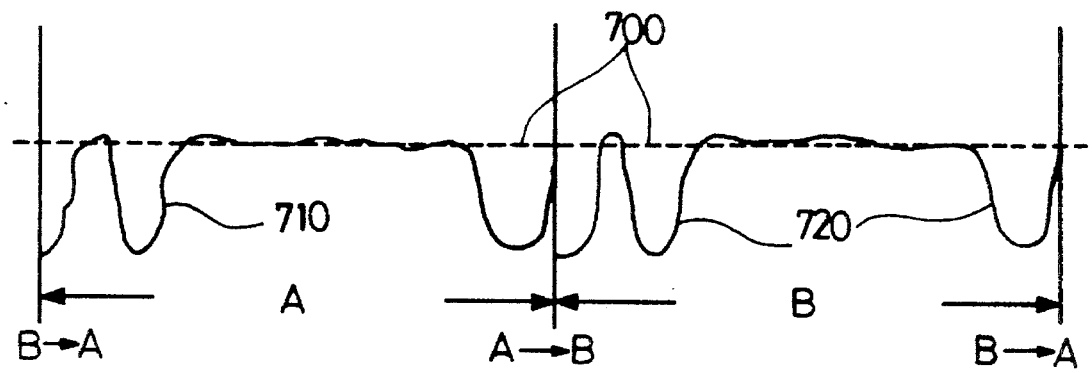
FIG. 15 is a waveform of an envelope detected video signal
Figure 16:
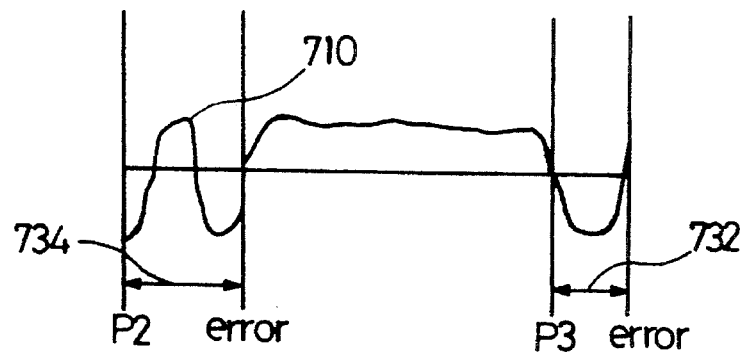
FIG. 16 is for analyzing the video signal.

As shown in FIG. 15, the video signal is detected by two heads A and B which are arranged in phase 180 degree on the drum. The waveforms 710 and 720 outputted from the heads A and B are somewhat different due to the different sensitivity of the heads A and B which are spaced by 180 degree in phase at the assembling the head drum. In the drawing, A-B and B-A denote head changing points, respectively.

When the P2 and P3 posts are not correctly adjusted, the start and end portions of the envelope waveform 563 (i.e., the head changing points) are distorted unpreferably. At this time, the waveforms outputted from the A and B heads are similar but not correctly coincided with each other.

Figure 21:
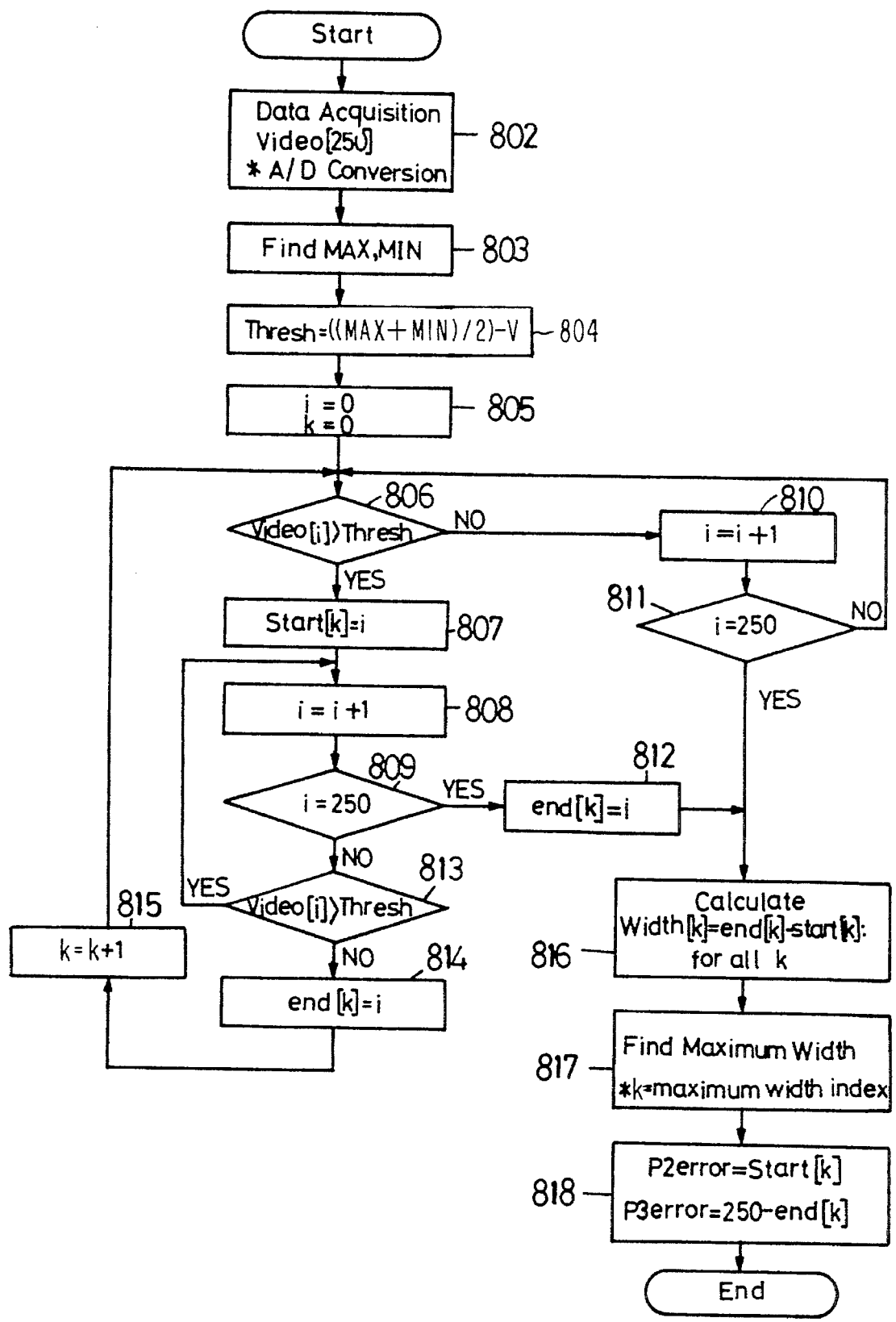
FIG. 21 is a flow chart for explaining a video signal waveform analyzing algorithm.

FIG. 21 illustrates an method of analyzing the envelope waveform of the video signal 561.

First, the video signal 561 read out by any one of the A or B heads is analyzed by way of a function RF-ANAL. The video signal from one video head A or B is converted to a digital signals VIDEO(250) which has 250 data at 802 step. Consequently, at a step 803, the digital signals are subjected to fine the maximum MAX and minimum MIN values, and at a step 804 the threshold values are calculated by the following equation. That is,

THRESH=[(MAX+MIN)/2]−V, where, V is a constant which always satisfies the condition of VIDEO(250)>THRESH after the adjustment has been completed with the video signal being linear and is selected through a proper test. Next, parameters i and k are made to be 0, at a step 805. Then, a start and end portions (the peaks) having the value larger than the THRESH are found from the video signal 561.

If the VIDEO>THRESH is initially found, then the start portion of the signal is substituted by i. And the value i is increased until the condition of VIDEO<THRESH is satisfied. when VIDEO<THRESH is satisfied, the end of the signal END is substitute by i and the k is increased. After the START (K) and END (K) have been determined as described, the deviation WIDTH (K) is calculated by WIDTH(K)=END(K)−START(K) between the START (K) and END (K) at steps 806–816.

Thereafter, the maximum value K of the deviation WIDTH is found to define the distances of the start point START (K) and the end point END (K) of the peak deviated away from the start point (i=0) and end point (i=250) of the video signal to be

P2 ERROR=START(K),

P3 ERROR=250−END(K), at steps 806 through 818, respectively. At this time, the errors calculated from the A and B head signal are added to each other. The P2 and P3 errors can be utilized effectively. That is, the P2 and P3 errors are linearly changed in adjusting the P2 or P3 post.

Figure 22A:
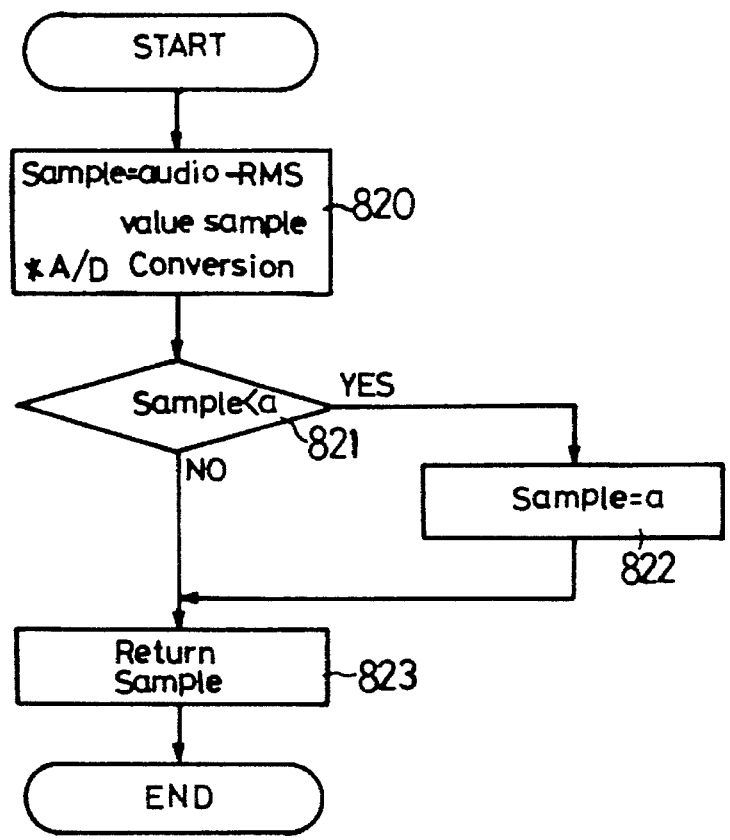
FIG. 22 (A) is a flow chart for explaining an audio signal waveform analyzing algorithm.
Figure 22B:
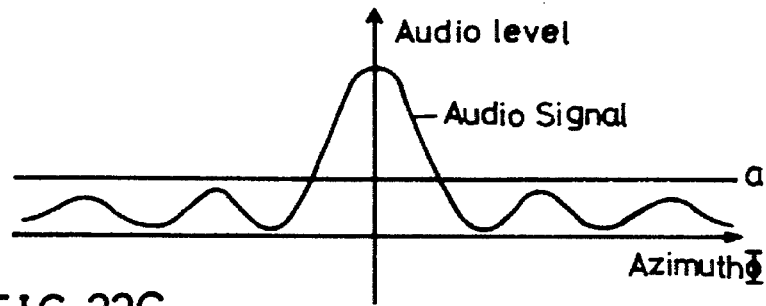
Figure 22C:
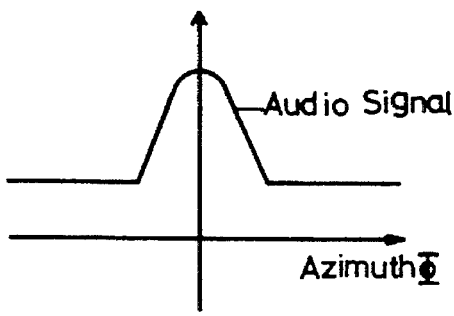

FIG. 22 (A), (B), and (C) illustrates an audio signal processing algorithm according to the present invention.

At a step 820, an audio signal SAMPLE is measured by using an effective value audio- RMS of an audio signal of 7 KHz which is digitally converted. In this case, all of signals below a level "a"[shown in FIG. 22(B)] affected on a maximum value detecting algorithm are clamped into the level "a" to take a Audio Signal which waveform is shown in FIG. 22 (C) , at steps 821 through 823.

A process of adjusting the tape running system by controlling the tape running system adjusting mechanism by the control means will be described.

Figure 23:
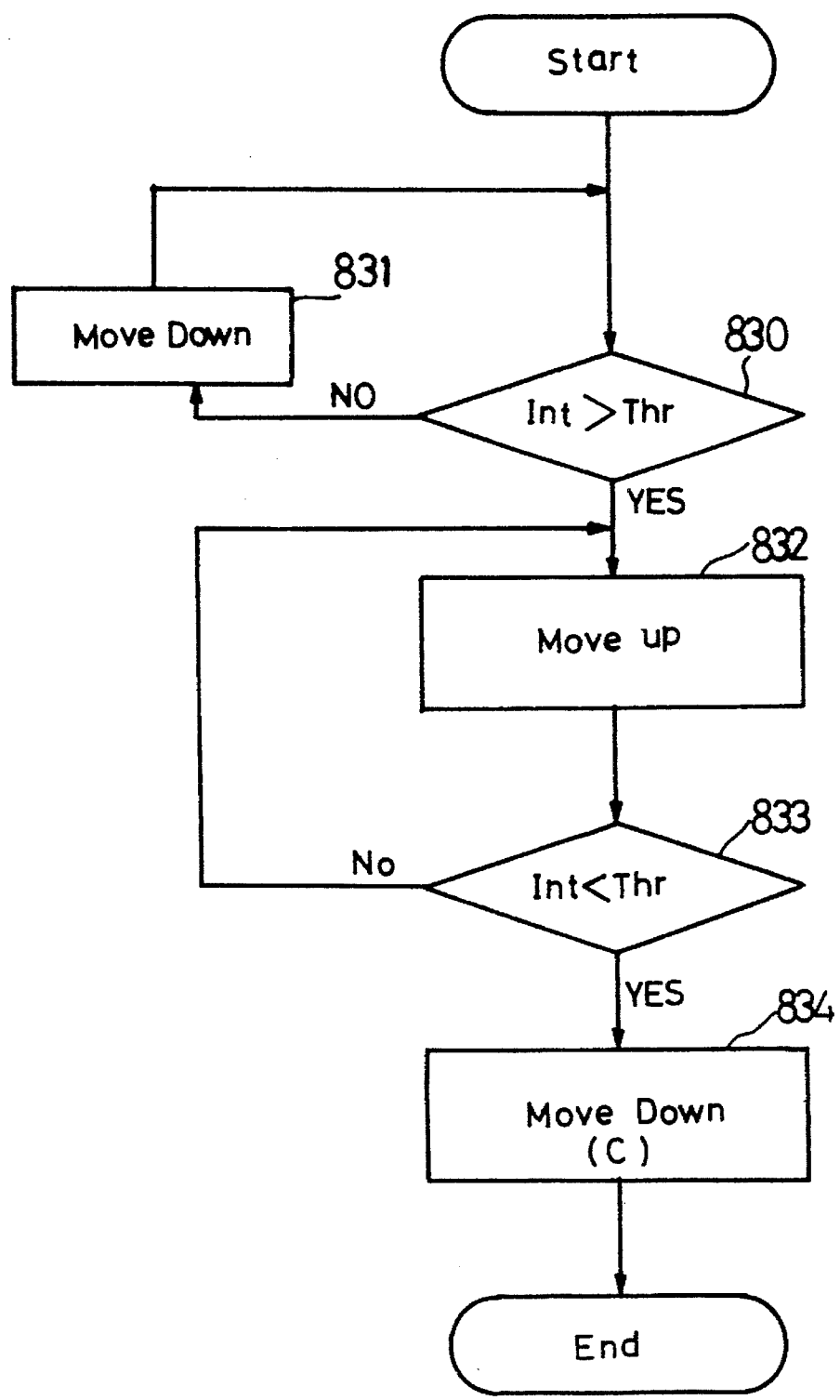
FIG. 23 is a flow chart for explaining a method of adjusting the P4 post.

FIGS. 23 through 26 shows flowcharts of an automatic tape running system adjusting process according to the present invention. Referring to FIG. 23 illustrating a algorithm of the P4 post adjusting process, if the brightness signal INT of the P4-side camera is larger than the reference value THR, that is, if the point is bright, the P4 post is continuously moved up by the adjusting mechanism. During moving the P4 post up, if the brightness signal INT is decreased, the P4 post is moved down by a constant value "C", at steps 830 through 834.

In this case, if the brightness signal INT is initially dark, then the P4 post is continuously moved down until the brightness signal INT is lighted and, thereinafter, the P4 post is moved up again. And, once the brightness is dark, the P4 post is somewhat moved down again by the adjusting mechanism.

Figure 24A:
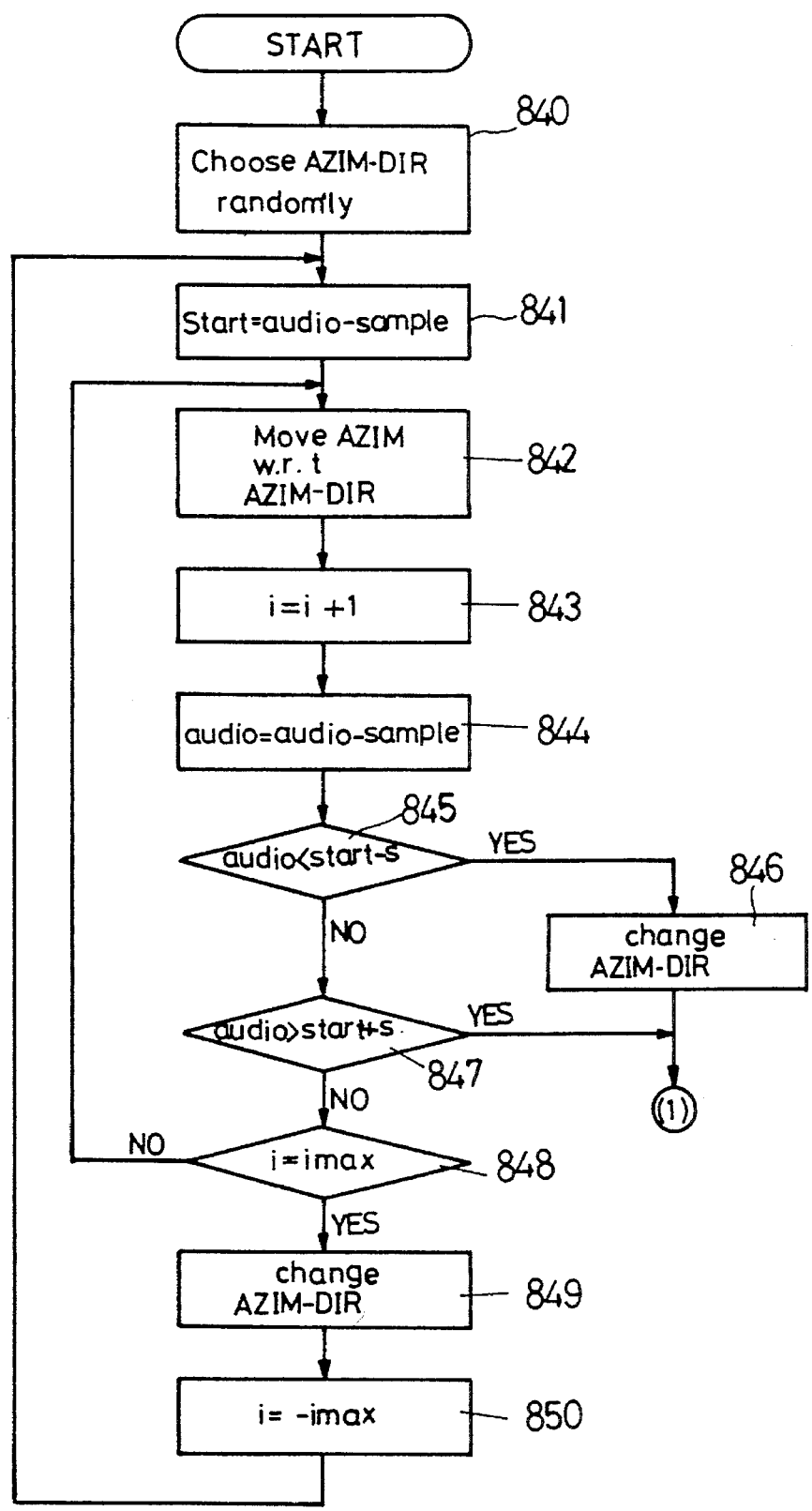
FIG. 24 is a flow chart for explaining a method of adjusting an azimuth control screw.
Figure 24B:
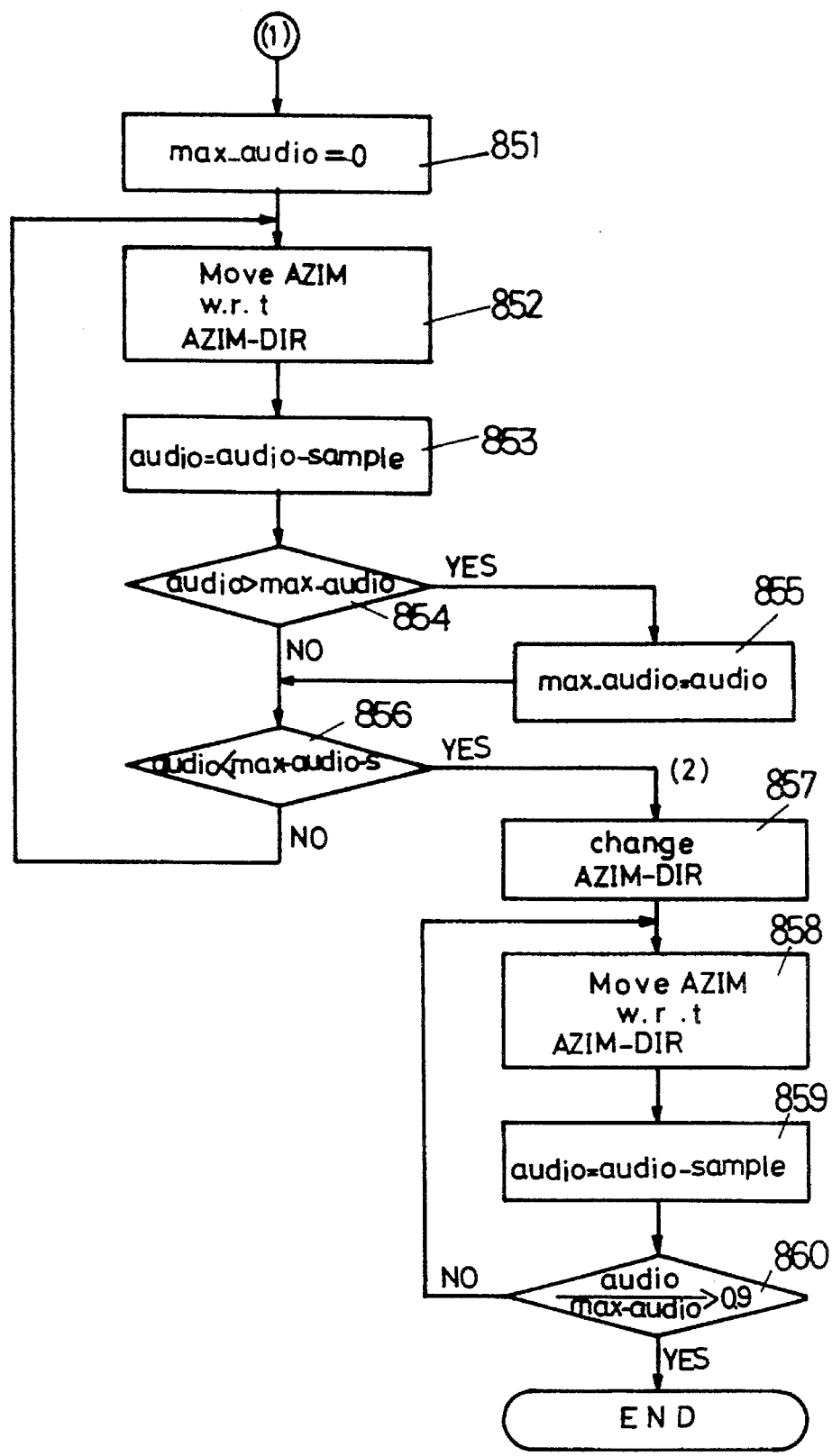

Referring to FIG. 24 (A) and (B) illustrating a process of adjusting azimuth control screw in the audio and control head assembly, at a step 840 an AZIM-DIR representing the direction of adjusting the azimuth screw is randomly chosen at the initial time and, at step 841, the present audio value (at the beginning of the adjustment) is set to START. The change of the audio value is observed while moving the azimuth screw along the AZIM-DIR direction. If the audio signal value is smaller than the START–s (constant), this means that the direction of adjusting the azimuth screw is incorrect. Alternatively, if the audio value is larger than the START+s (constant) means that the direction of adjusting the azimuth screw is correct. But, if the azimuth screw is rotated by a constant angle (a limited value) regardless the audio value being smaller or larger than the START–s or START+s, the direction of the azimuth screw is changed and the adjustment is restarted. At this time, I=–imax is set so as to compensate the value rotated heretofore.

In the drawing, Node(l) indicates that the direction of the adjustment is correctly set and, thereinafter, a process for finding the maximum value MAX-AUDIO of the audio level is carried out. More particularly, the maximum value is found while adjusting the azimuth screw continuously along the direction correctly set. If the present audio is smaller than the MAX-AUDIO–s, this means that the presently adjusted position is passed through the position related to the maximum value. Accordingly, it is determined that the maximum value is correctly set as shown by (2) in FIG. 24B, at steps 851 through 856.

Next, if the direction of the adjustment is changed and the azimuth screw is adjusted to be reached at a position of AUDIO/MAX-AUDIO>0.9, the adjustment is completed, at steps 59 through 860. In the drawing, w.r.t denotes "with respect to", which means the same direction.

Figure 25:
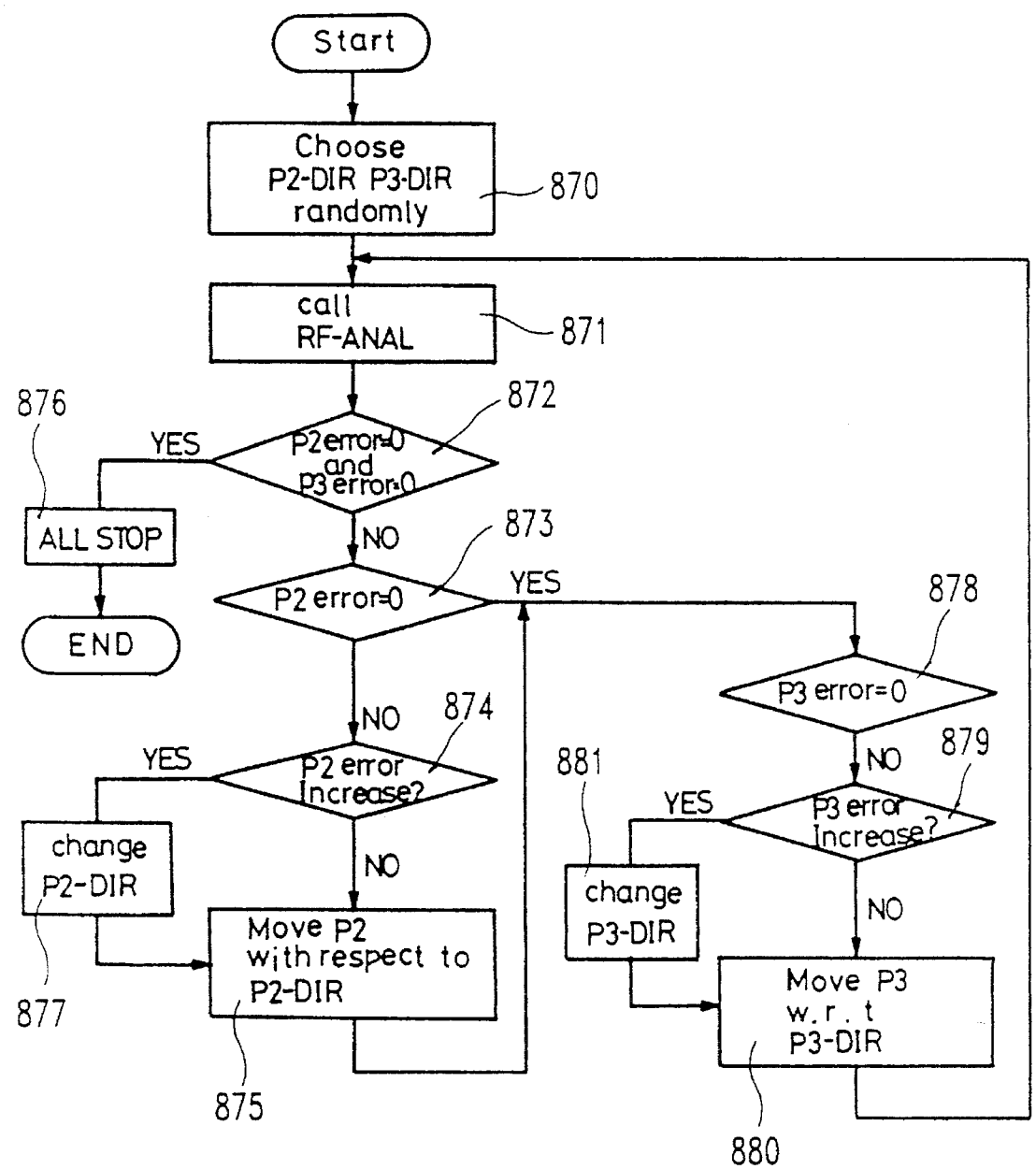
FIG. 25 is a flow chart for explaining a method of adjusting P2 and P3 posts.

Referring to FIG. 25 illustrating a process of adjusting the P2 and P3 posts by processing the video signal, the P2-DIR and P3-DIR are randomly chosen at a step 870. At steps 871 and 872, the function RF-ANAL is applied to check that the PI-ERROR and P3-ERROR are either 0 or not, if the ERRORS are 0 at a step 876, the adjustment is completed. While, if the ERRORS are not "0", the P2-ERROR is checked at a step 873. As a result, if the P2-ERROR is not 0, then the increase of the P2-ERROR is checked at a step 874. If the P2-ERROR is not increased, the P2 post is moved in a P2-DIR direction at a step 875. Alternatively, if the P2-ERROR is increased at the step 874, then the P2 post is turned in the counter direction to the P2-DIR direction at a step 877. Consequently, the P3-ERROR is checked at a step 878 and if the P3-ERROR is not 0, then the increase of the P3-ERROR is checked. As a result, if the P3-ERROR is not increased, then the P3 post is moved in the P3-DIR direction at a step 880. Alternatively, if the P3-ERROR is increased at the step 879, then the P3 post is moved in the direction changed against the P3-DIR direction at a step 881. Thereinafter, the control is returned to the step 871 to repeat the above-mentioned steps.

Figure 26:
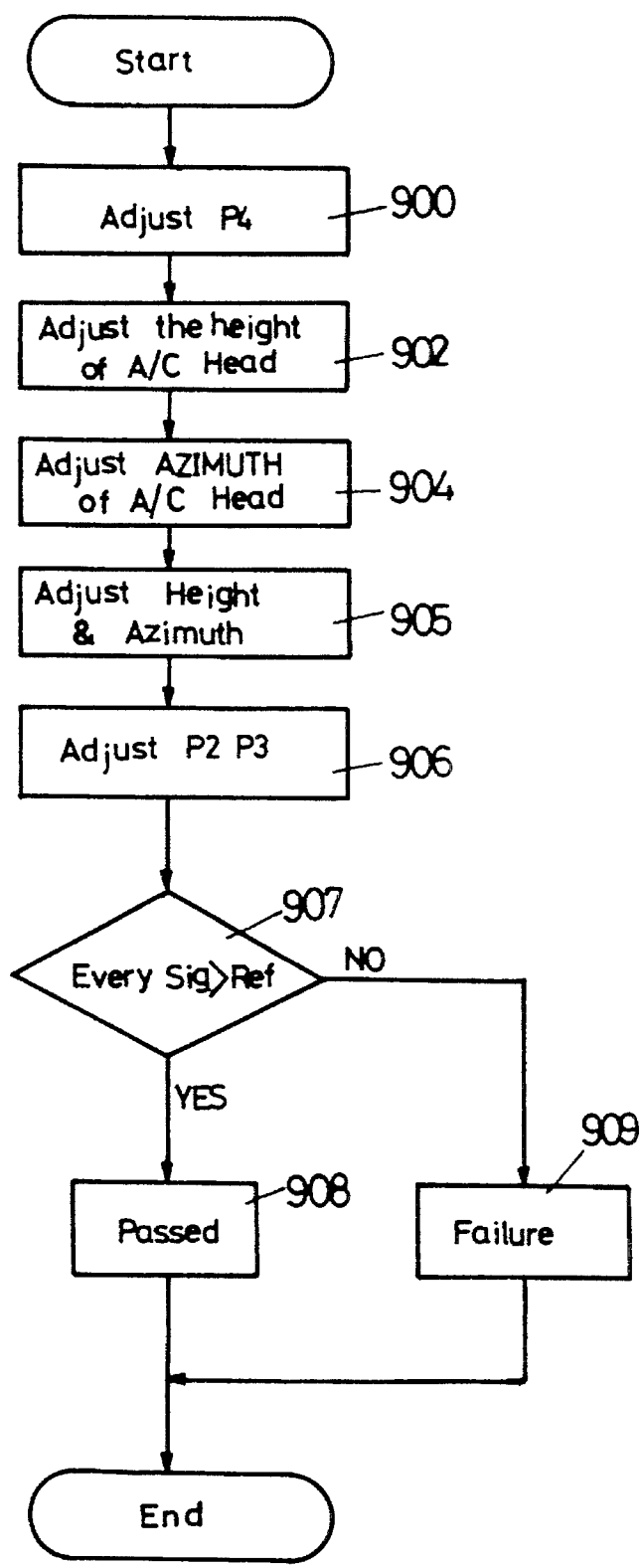
FIG. 26 is a flow chart for explaining the operation of a control means controlling the entire apparatus.

FIG. 26 showing a flowchart illustrating a process for controlling the entire apparatus.

First, the controller continuously checks whether the deck to be adjusted is arrived to the working position. If the deck is arrived to the position, the deck adjusting mechanism is moved down and contacted with the deck. Next, at a step the P4 post is adjusted by the mechanism. After the P4 post has been adjusted the height control nut of the audio and control head assembly is adjusted, by the mechanism at a step 902 and the azimuth control screw is then adjusted at a step 904. At a step 905, the height control nut and the azimuth screw are simultaneously adjusted.

After the P2 and P3 posts have been adjusted, the controller checks that various signals are in a predetermined range, at a step 907. I the signal are in the range, then the controller determines that the adjustment is acceptable, at a step 908. On the contrary, if the signals are not in the range, the controller determines that the adjustment is not acceptable, at a step 909.

As noted above, according to the embodiment of the present invention, the P2,P3 and P4 posts, the height nut an the azimuth screw can be automatically adjusted without manual adjustment effected by the worker.

Further, the difference in adjusting quality can be overcome and the adjustment can be rapidly effected.

Now, a second embodiment of the present invention will be described in more detail.

In the description of the second embodiment of the present invention, the same or similar parts and components to those of the first embodiment are denoted by the same reference numeral.

Figure 27:
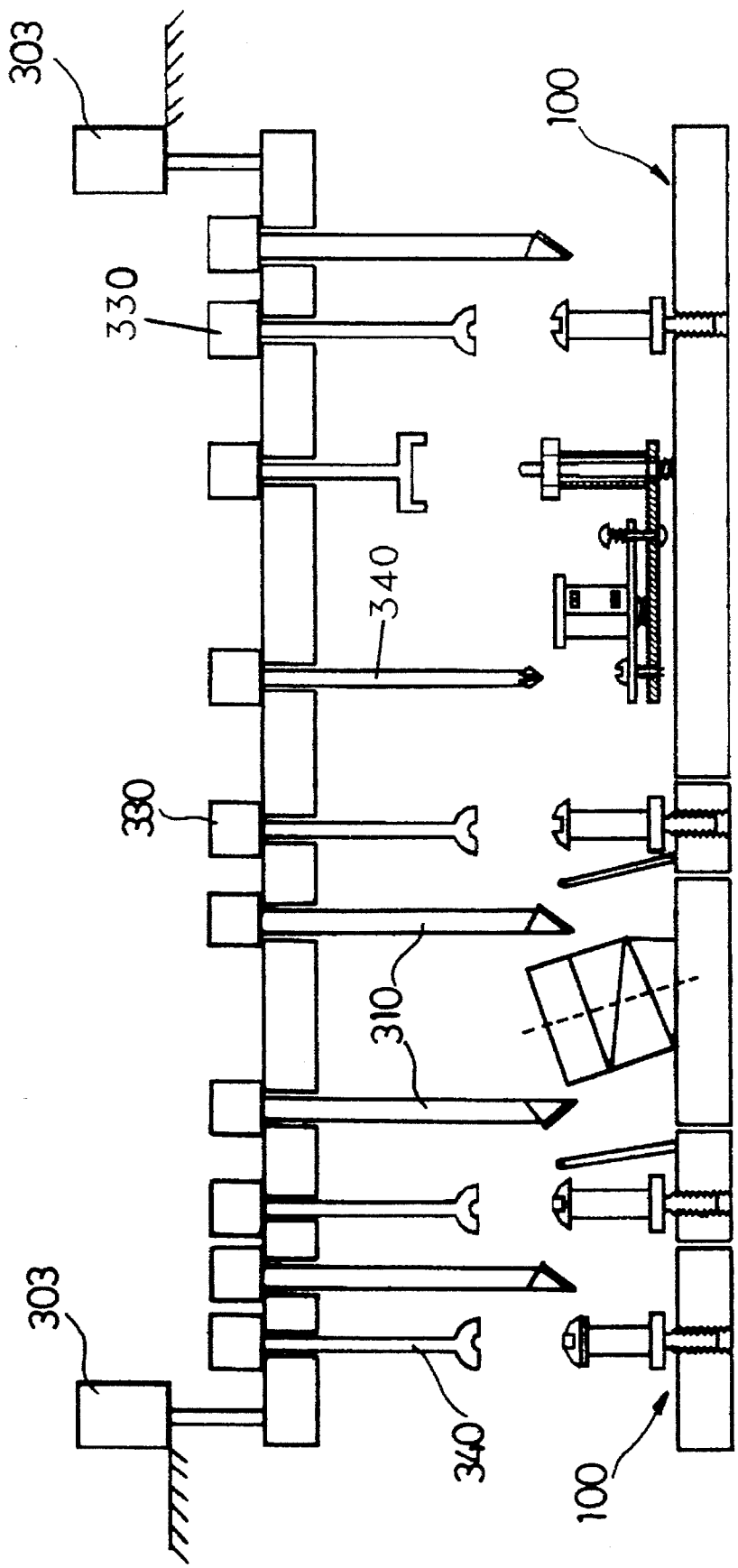
FIG. 27 is a schematic view illustrating a relative position between a tape running system according to another embodiment of the present invention and a tape running system in an ordinary deck mechanism.
Figure 28:
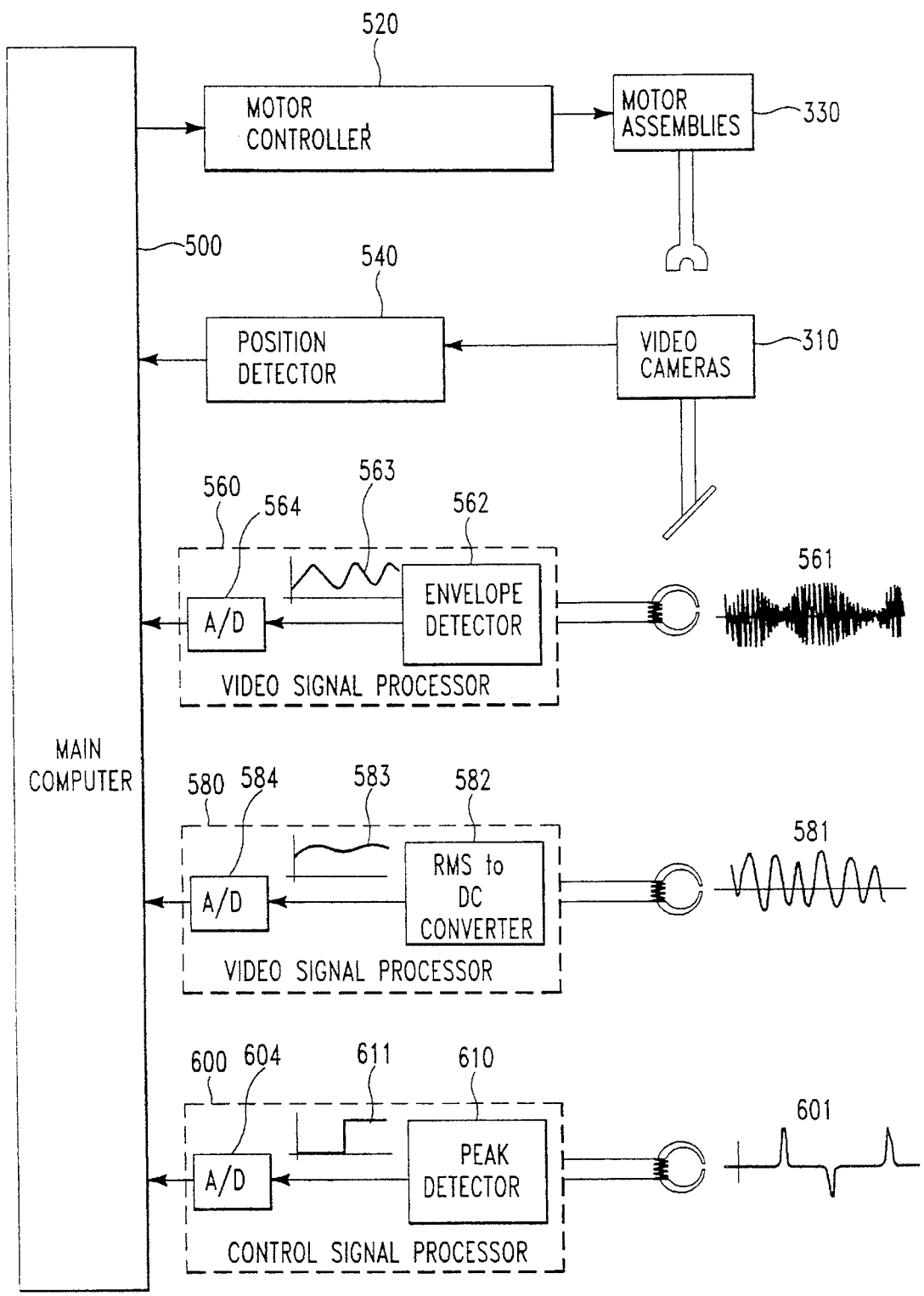
FIG. 28 is a block diagram showing a control unit.

FIG. 27 shows a tape running system adjusting mechanism according to the second embodiment of the present invention, and FIG. 28 shows block diagram of the control means of the second embodiment of the present invention.

The controller embodied to this embodiment includes the main computer 500, the motor controller 520, the position detector 540, the video signal processor 560 and the audio signal processor 580 and controls the entire deck adjusting process. More particularly, the controller receives the video signal and data related to the video and audio signals representing the position of the tape positioned on the post P4 and the audio and the control head assembly from the video camera and controls the motor for the screw driver tip assembly such that the video, audio and control signals are to be within predetermined range and the deck adjusting process is effected continuously.

The motor controller 520 includes a CPU, a ROM and RAM, a digital to analog converter, an encoder, a communication port which reconnected with each other through a data bus, a servo motor driver is connected to the digital to analog converter 520d, the servo motor 520h is connected to the servomotor driver 520g and a pulse generator 520i is connected to the servo motor 520h and, in turn, connected to the encoder 520e at signal output side thereof.

In the construction of the motor controller, the CPU receives a motor control instruction from the main computer in the controller through the communication port and processes the instruction on the basis of program and data previously stored in the ROM and RAM. As a result, the CPU produces a digital motor control signal which is, in turn, supplied to the digital to analog converter.

The converter converts the digital motor control signal into analog signal which is subsequently amplified by the servo motor driver. Then, the motor rotates by the amplified control signal and the screw driver tip assembly connected to the motor is also rotated. Accordingly, pulses proportional to t h e rotated angle of the motor are produced by means of the pulse generator and supplied to the encoder which counts the number of the pulses and convents the counted pulse into a parallel signal. Thereinafter, the CPU determines whether the motor, particularly, the screw driver is rotated by a desired angle, on the basis of the parallel signal supplied from the encoder.

The positioning detector 540 receives an image of the tape guided by the audio and control head assembly and an image of the tape guided by the post P4 and enters the tape position data to the main computer. This function of the position detector is carried out by a hardware so-called a frame grabber, which is mounted in the expanding slot of the main computer and converts the analog video signals into digital signals and a central processing unit for data processing which is co-operated therewith. The central processing function is effected by the main computer 500 but it is to be understood that the function may be achieved by way of a separative computer.

Figure 29A:
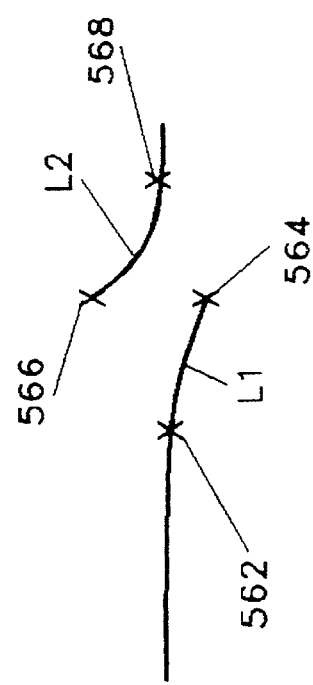
FIG. 29 is for illustrating a envelope wave form analyzed by a video signal processor.
Figure 29B:
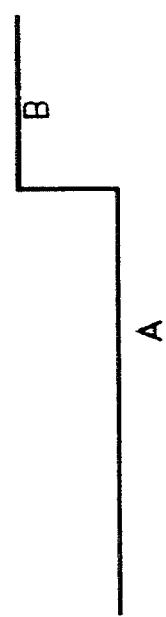

The position detector converts the video signal from the CCD camera into digital signal so as to obtain a brightness signal related to a frame of the picture image (for example, 512×512 pixels). For instance, the position detector receives the video image (refer to FIG. 29A) from the video camera and detects the position of the post and tape, which is, in turn, transferred to the main computer 500. In this case, each of the pixels takes a value in the range of 0 to 255. If an image of FIG. 29A is obtained from the tape under a proper lighting, then the values sampled by the frame grabber can be expressed as is shown in FIG. 29B. At this time, the position of the lower side of the tape can be detected by checking any column of the values and finding interfacing portions where the values are changed from 100 to 0, from 0 to 255, and from 255 to 0. In fact, the brightness of the image is uneven, as described above. Accordingly, a thresholding process is effected by taking 80 as a reference value and a mapping processing is then effected by taking the value larger than the thresholding value (i.e., 80) as 1 and the value lower than the thresholding value as 0 so as to detect the lower side of the tape. Each of the points to monitored is processed by using a proper thresholding value.

In the video signal processor 560, the envelope detecting circuit 562 amplifies and detects the video signal produced from the video head to obtain an envelope waveform 563 which in turn is converted into digital signal by an analog to digital converter 564. The digitized signal is supplied to the main computer 500 (refer to FIG. 12).

In FIG. 29(A) shows the envelope waveform 563 and (B) shows the head change signal.

The envelope waveform 563 is sensitively responded to portions where the A/B heads are changed and the important points are denoted by generally designated by 562,564, 566 and 568. The points 564 and 566 can be measured by using data sampled by the A and B head change signal at positions somewhat before and after the signal, while the points 562 and 568 are found by scanning the position on which no data is changed, on the basis of the points 564 and 566. Consequently, a linearity of a straight line L1 between the points 562 and 564 and of a straight line L2 between the points 566 and 568 are measured so as to adjust the P2 and P3 posts.

The linearity of the envelope waveform 563 can be obtained by dividing the minimum value (the point 564 in the example) of the envelope waveform (563) by the maximum value (the point 566) thereof.

The audio signal processor 580 amplifies and detects the signal 568 outputted from the audio head in the deck by an effective value (RMS) to DC converter in the converter 582 to obtain the effective value 583. This value 583 is converted into digital signal which in turn is supplied to the main computer 500. An optimum adjustment can be achieved by rotating the azimuth screw clockwise or counter-clockwise in the direction of which of variable value of the azimuth is increased.

The control signal processor 600 has a peak detector 610 which holds a peak value 611 detected from the signal 601 produced by the control head and an analog to digital converter 604 which converts the holden peak value 611 into digital signal which in turn is supplied to the main computer 500.

Figure 30A:
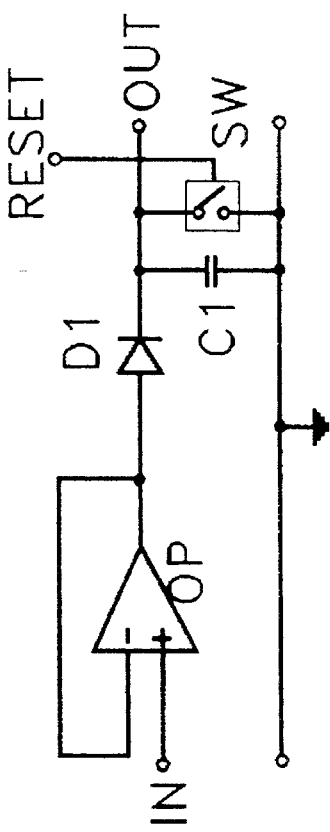
FIG. 30 (A) is a diagram partially showing a circuit for a control signal process and 30 (B) showing a waveform of the control signal processed.
Figure 30B:
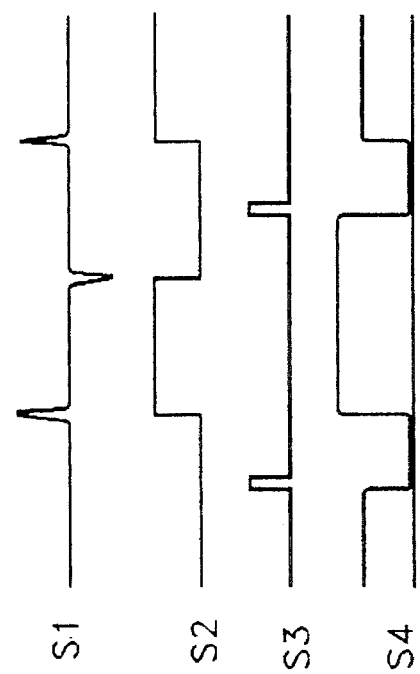

FIG. 30 (A) shows the peak detector circuit. In the drawing, the control signal S1 is entered to a non-inverting terminal IN of an operation amplifier OP which amplifies the signal S1. The outputs signal of the operation amplifier OP is detected by a diode D1 and then smoothed by charging of a capacitor C1. Charges of the capacitor C1 is discharged to be reset when a switch SW receives a reset signal RESET. The output waveform of the peak detector 610 can be effectively controlled by the switch SW and the reset signal RESET can be controlled by the computer with a I/O port.

Referring to FIG. 30 (B), a signal waveform Sl is the control signal format, S2 is the head change signal, S3 is the reset signal of the control signal, and S4 is a output wave form passed through the peak detector 610. The peak value is measured by sampling S4 with lapse of constant time after resetting. The peak value is measured every sampling time and the height NUT is rotated randomly to find the direction of increasing value. Then, the adjustment is performed until the maximum peak of the control signal is found.

Figure 34:
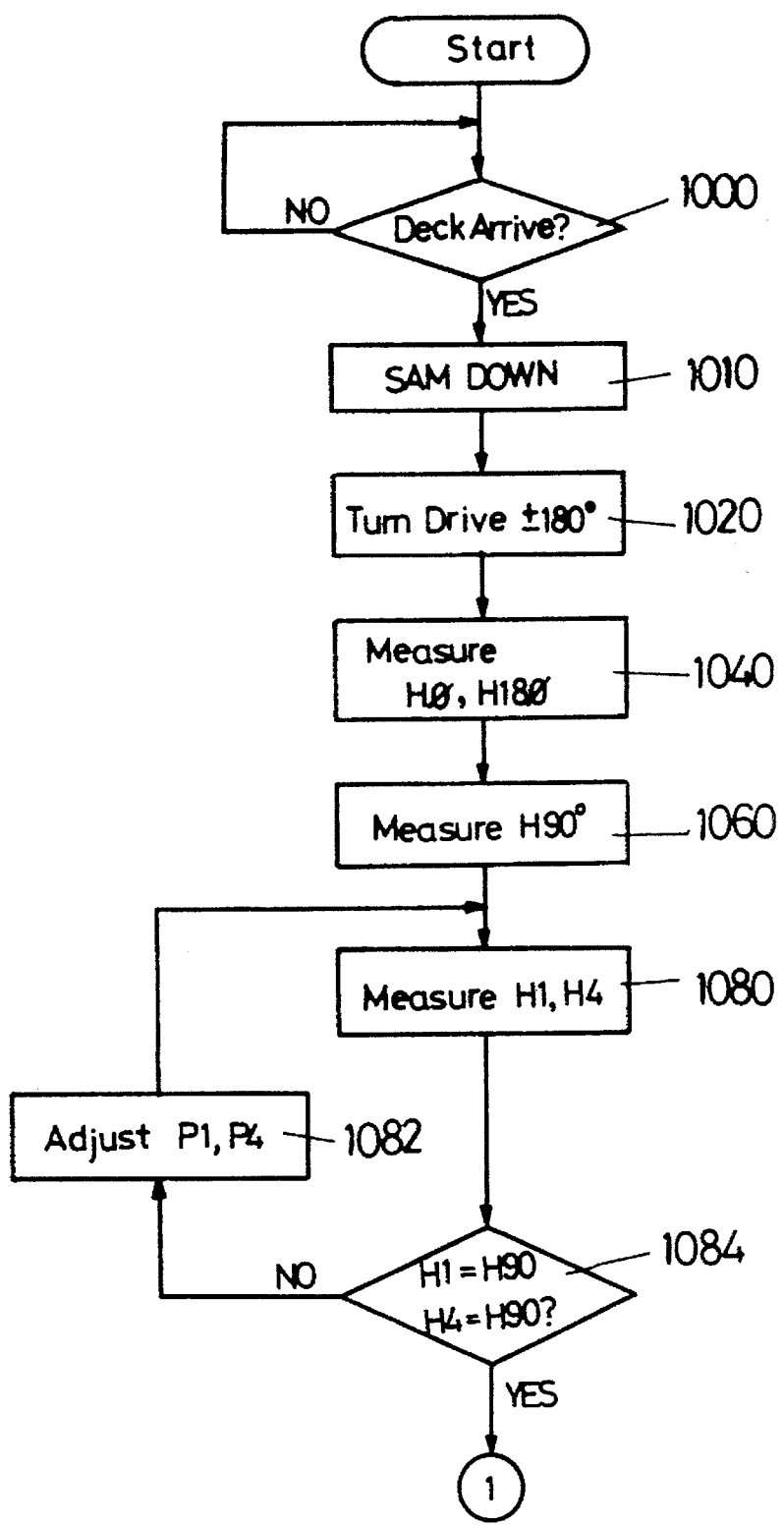
FIG. 34 is a flow chart for explaining a tape running system adjusting process of the control unit.
Figure 35:
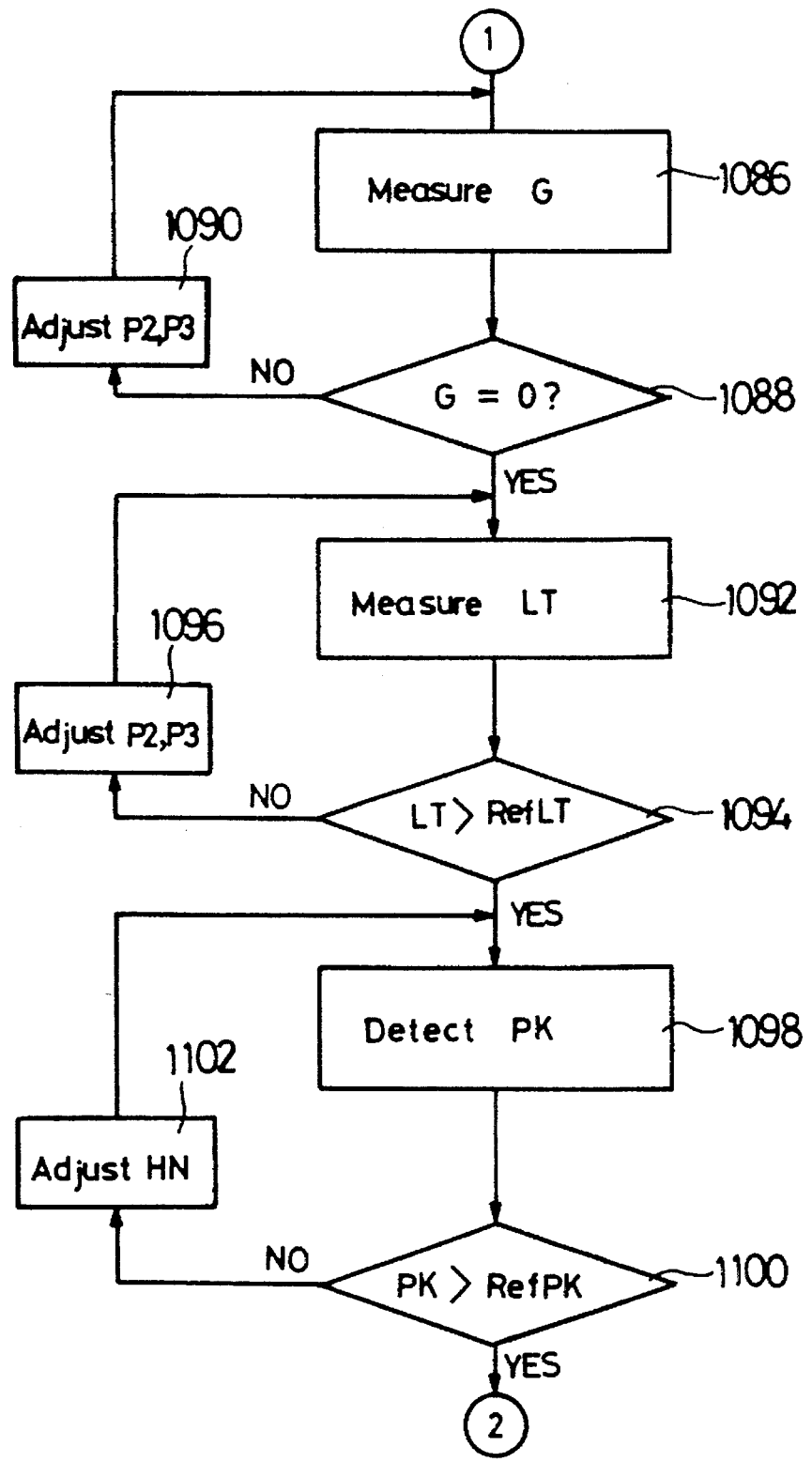
FIG. 35 is a flow chart for explaining a tape running system adjusting process of the control unit.
Figure 36:
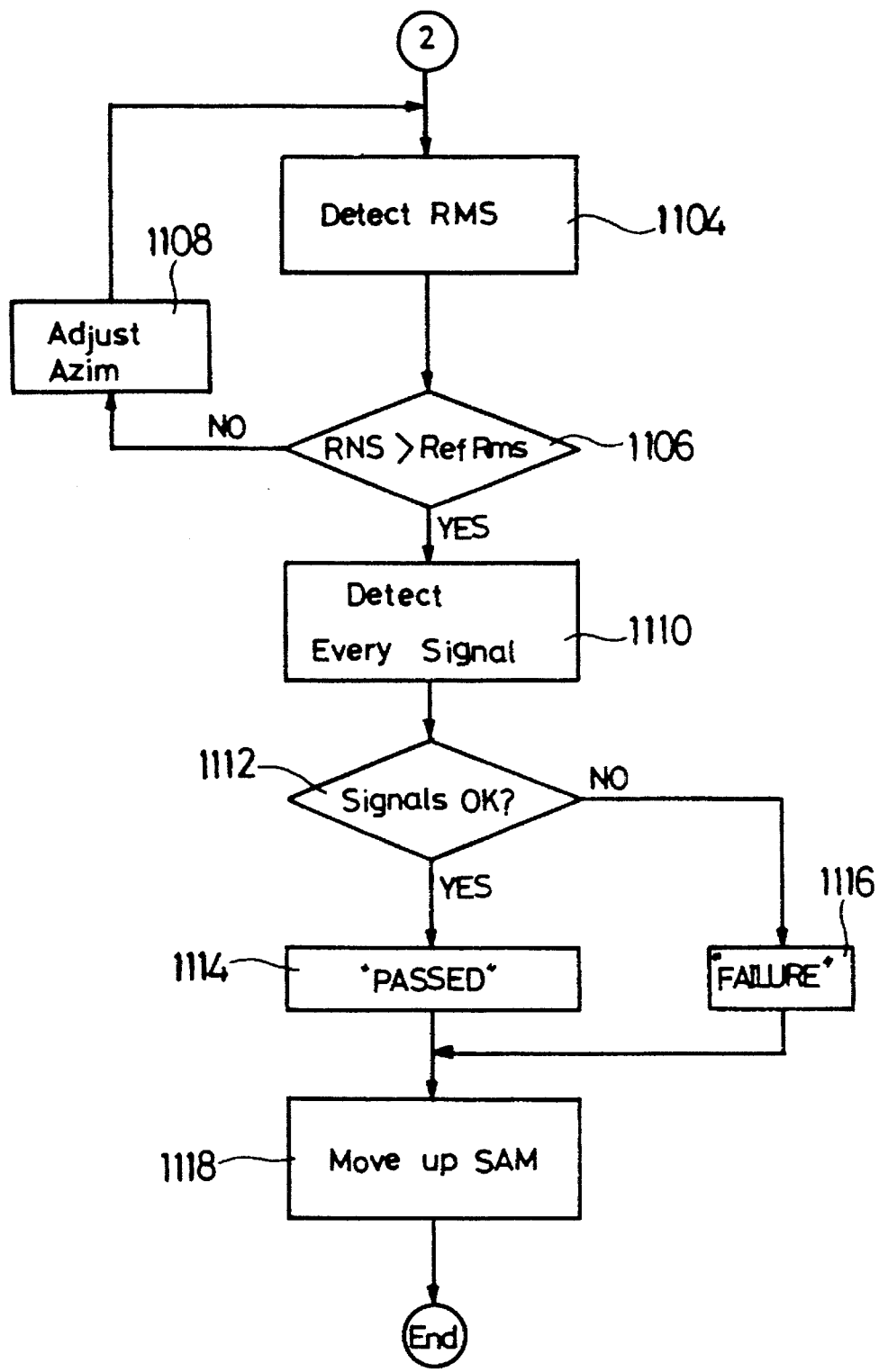
FIG. 36 is a flow chart for explaining a tape running system adjusting process of the control unit.

A process of adjusting the tape running system carried out by the adjusting mechanism will be described with reference to a flowchart shown in FIGS. 34, 35 and 36.

1. The controller checks if a deck to be adjusted reaches to the working area, at a step 1000. If the deck arrives to the working area, then the deck adjusting mechanism (SAM) is moved down to be coupled with the deck at a step 1010.

Figure 31:
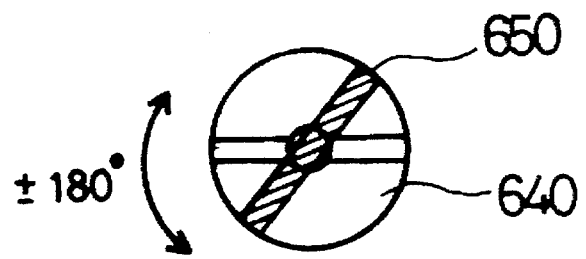
FIG. 31 is for illustrating a procedure of coupling the adjusting screws and a screw driver tip.

2. In order to join the driver tip head and the screw head or nut correctly, the driver is rotated clockwise or counterclockwise by a degree of 180 so as to be joined with the driver tip and the screw head or nut, at a step 1020. That is, as shown in FIG. 31, the driver tip 650 is rotated by 180 in the right or left direction to be joined with the groove of the screw head 640 under that the driver tip 650 is resiliently pressed against the screw head 640. When the hexagonal nut is used, the driver tip has a hexagonal groove in which the nut is inserted and conjoined.

Figure 32:
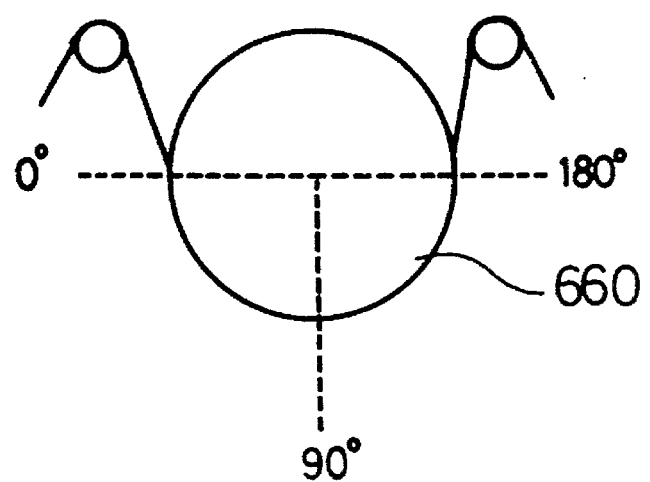
FIG. 32 is for explaining a phase of head drum in degree.

3. The height of the lead line of the head drum 660 is measured in order to approximately adjust the height of the P1, P2, P3 and P4 posts, at a step 1040. This measure of the height of the lead line can be carried out by way of the video camera disposed on the inlet(0°) and outlet (180°of the head drum, as shown in FIG. 32, thus a height of the inlet (H0°) and outlet (H180°) of the head drum are measured.

4. Next, at a step 1060 the height of the lead line of the head drum 660 of a phase of 90° (H90°) is calculated by using the lead line height of the inlet and outlet of the drum 660.

5. A height H1 of the lower side of the P1 post and a height H4 of the lower side of the P4 post are also measured by using the image from video camera and compared with the height of the lead line at a phase of 90° at steps 1080. Then, the P1 and P4 posts are adjusted (rotated) to be accorded with the lead line height H90° of the drum, at a step 1082 and 1084.

6. After the step 1084, the gab G between the lower side of the tape at the inlet and outlet of the head drum and the lead line is measured at a step 1086 and the P2 and P3 posts are adjusted so that the gab G is to be 0, at steps 1088 and 1090.

7. Consequently, a linearity LT of the envelope value of the video signal taken from the video head of the drum is measured at a step 1092, and the LT measured is compared with the reference value RefLt at a step 1094. At a step 1096, the P2 and P3 posts are adjusted again to be larger than the reference value.

8. A peak value of the control signal Pk outputted from the control head is measured at a step 1098 and, then compared with the reference value RefPk at a step 1100. At a step 1102, the head height nut HN is adjusted to be larger than the reference value RefPk.

9. After the effective value RMS of the audio signal from the audio head is measured at a step 1104, the azimuth screw AZIM is adjusted so that the effective value RMS is increased above the reference value RefRms, at a steps 1106 and 1108.

10. After the process described above is carried out again, every signal is measured at a step 1110, and compared with the corresponding reference values at a step 1112.

As a result, if the all of the measured values satisfy the reference values at a step 1112, then "passed" is indicated. Alternatively, if the values do not satisfy the reference values, "failure" is indicated at a step 1114 and 1116

Thereinafter, the adjusting mechanism is moved up at a step 1118.

Each of the steps, if the screw is out of the limit of the adjusting nut, the control is bypassed to subsequent adjusting step. AT the 3 and 4 steps the height of the lead line can be easily measured by disposing the video camera in a phase of 90 relative to the head drum.

FIG. 33 illustrates the process of determining the envelope waveform and adjusting the P2 and P3 posts at the process 7. The envelope waveform produced in the vicinity of the timing T on which the A/B heads are changed are compared to adjust the P2 or P3 post, as is shown in FIG. 33. That is, when the envelope waveform is obtained as shown in FIG. 33 (1), the P3 post is rotated and adjusted in a clockwise direction. When the waveform is produced as shown in FIG. 33 (2), the P3 post is counterclockwise.

Alternatively, in a case of envelope waveform shown in FIG. 33 (3), the P2 post is rotated in a clockwise direction while in a case of envelope waveform shown in FIG. 33 (4), the P2 post is rotated in a counterclockwise direction.

The good linearity of the envelope waveform is above 0.8. At the processes 8 and 9, it is preferable that the audio and control signal are controlled in maximum value.

As described above, according to the embodiment of the present invention, the P2, P3 and P4 posts, the height nut and the azimuth screw can be automatically adjusted without manual adjustment carried out by the worker.

Further, the variances in adjusting quality can be overcome and the adjustment can be rapidly carried out.

Although the present invention has been described with respect to the specified embodiments, it is to be understood that various changes and modifications will be made therein without departing from the scope and spirit of the invention.

What is claimed is:

1. An automatic deck adjusting apparatus having a tape running system adjusting mechanism for adjusting a tape running system and control means for controlling the tape running system adjusting mechanism to adjust the tape running system of a deck mechanism in a VCR automatically, said tape running system adjusting mechanism comprising:

a plurality of screw driver tip assemblies for screwing adjustment screws and/or nuts in the system;

a motor assembly for rotating said screw driver tip assemblies by a predetermined angle;

a driver housing for fixedly supporting said screw driver tip assemblies and said motor assembly in place;

a means for moving said housing to adjusting position and to standby position, being attached to said driver housing;

a positioning means for aligning a deck mechanism to be adjusted and said screw driver housing in an exact position with each other; and, a video camera for monitoring the position of said tape passing through guide posts and an audio and control head assembly.

2. The apparatus according to claim 1, wherein said driver tip assembly is constituted such that a flange formed on a driver tip is coupled to a spline shaft flange connected to a spline shaft, said spline shaft flange has a screw hole being formed smaller than a screw head but larger than a screw axis to be set at a appropriate position, said spline shaft is inserted into a spline hole of a connecting tube connected to a driven shaft by way of a set screw so as to transfer the rotation of said driven shaft to said screw driver tip, and a spring is disposed between said driven shaft and a head of said spline shaft to provide a pressure in rotating said screw driver tip.

3. The apparatus according to claim 1, wherein said motor assembly serve to produce a driving force needed to rotate said driver tip assemblies and are constituted such that a wave generator of a harmonic drive is connected to a shaft of a servo motor, a driving shaft is connected to a flex spline of said harmonic drive, and a timing belt is provide to connect said driving shaft and said driven shaft connected to said driver tip assembly.

4. The apparatus according to claim 1, wherein said driver housing for connecting said driver tip assembly and said motor assembly is constituted such that an upper plate and a lower plate are coupled with each other by a plurality of spacers and a power transferring portion is disposed between the upper and lower plates, said driver tip assemblies being suspended below said lower plate.

5. The apparatus according to claim 1, wherein said moving means moves said drive housing down to adjust said tape running system and moves said drive housing up to move a pallet having deck thereon along a conveyer to a working area, and is constituted such that a driving rod of a pneumatic cylinder mounted on a fixed support is connected to a medium plate, the medium plate being coupled to said lower plate of said driver housing by at least three rubber rods, and at least one column is slidably coupled to said fixed support so as to guide said medium plate to be moved upward and downward.

6. The apparatus according to claim 5, wherein said pneumatic cylinder has a cushion member reducing the speed at a lower dead point thereof so as to take the correct position of said positioning means and said driver tip.

7. The apparatus according to claim 1, wherein said positioning means for according said deck to be adjusted and said driver housing in position comprises an upper guide having a groove formed at a center thereof and attached to said lower plate, and a lower guide serving as a conical post of said plate.

8. The apparatus according to claim 7, wherein said upper guide is coupled to said lower plate with a spring serving as a resilient absorber through a ball bushing disposed in said groove of a guide housing.

9. The apparatus according to claim 1, wherein said video camera is constituted such that a mirror is slantly attached to an end of an extended pipe to reflect a light path vertically, said mirror and a magnifying lens are connected to a pipe and a lens coupling member, said magnifying lens and a CCD element are connected to a mirror box, and a distance between said CCD element and said lens is adjusted by a distance adjustable knob to form an image correctly focused on said CCD element.

10. A automatic deck adjusting apparatus having a tape running system adjusting mechanism for adjusting a tape running system of a deck mechanism in a VCR automatically and control means for controlling said adjusting mechanism to adjust said tape running system automatically, said tape running system adjusting mechanism comprising:
   a plurality of screw driver tip assemblies for screwing adjustment screws an/or nuts in said system;
   a motor assembly for rotating said screw driver tip assemblies by a predetermined angle;
   a driver housing for fixedly supporting said screw driver tip assemblies and said motor assembly in place;
   moving means attached to said driver housing for reciprocating said housing;
   a positioning means aligning said deck mechanism and said screw driver housing to be coincided in position with each other when they are coupled together; and,
   a video camera for monitoring said position of said tape passing through guide posts and an audio/control head assembly;
   said control means comprising:
      a main computer for controlling entire apparatus;
      a motor controller for controlling said motor assembly to rotate said driver tip assemblies by a predetermined angle under a control of said main computer;
      a position detector for receiving video signals from said video camera monitoring the position of the tape passing through guide posts and audio and control head assembly, calculating said position of the tape on said posts and head assembly and informing the position of said tape to said main computer;
      a video signal processor for amplifying and detecting said video signal produced from a video head in the deck, obtaining an envelope waveform from the detected video signal and converting said envelope waveform to digital signal to be transferred to said main computer; and,
      an audio signals processor for calculating an effective value of signal produced by an audio head in said deck, wherein said main computer controls said tape running system adjusting mechanism, said motor controller, said positioning detector said video signal processor, said audio signal processor and said control signal processor to adjust automatically said tape running system of said deck.

11. A method of adjusting a tape running system of a deck mechanism in a VCR, the tape running system having
   a reference surface,
   a head drum,
   an audio and control head assembly having a height control nut and an azimuth control screw,
   a capstan and pinch roller pair, and
   a tape path guide system for guiding a tape from a supply wheel to a take-up wheel, the tape guide system having:
      a tape inlet side limit post P1 located between the supply wheel and the head drum,
      a tape inlet side slant post P2 located between P1 and the head drum,
      a tape outlet side slant post P3 located between the head drum and the audio and control head assembly, and
      a tape outlet side limit post P4 located between the audio and control head assembly and the capstan and pinch roller pair, with an automatic deck adjusting apparatus having
   a tape running system adjusting mechanism for adjusting the tape running system, the tape running system adjusting mechanism including
      a plurality of screw driver tip assemblies for screwing adjustment screws and/or nuts in the tape running system,
      a motor assembly for rotating the screw driver tip assemblies by a predetermined angle,
      a driver housing for fixedly supporting the screw driver tip assemblies and the motor assembly,
      means for moving the driver housing to an adjusting position and to a standby position, the means for moving being attached to the driver housing,
      a positioning means for aligning the deck mechanism of the tape running system to be adjusted and the driver housing in an engaging position with each other, and
      a video camera for monitoring the position of the tape passing through the guide posts and the audio and control head assembly, and control means for controlling the tape running system adjusting mechanism, the method comprising the steps of:
   (a) checking the deck to be adjusted to a working position and contacting the deck with the deck adjusting mechanism moved downward into the adjusting position;
   (b) adjusting the tape outlet side limit post and then adjusting the height control nut of the audio and control head assembly, adjusting the azimuth control screw, and adjusting the height control nut of the audio and control head assembly and the azimuth control screw simultaneously;
   (c) adjusting the tape inlet and outlet slant posts, checking the value of every signal to be in a predetermined range, the deck having signals defined within the range being determined as "passed" and/or "failure".

12. The method according to claim 11, wherein said P4 post adjusting process at said step (b) comprises:
   irradiating the point of said tape on said P4 post, receiving the light reflected on said point to detect a strength INT of said reflected light; and
   moving said P4 post up when said strength INT is larger than a reference THR and moving said P4 post down by a constant value once said strength INT is small than the reference value.

13. The method according to claim 11, wherein said adjusting step of said height control nut of said audio and control head assembly and said azimuth screw comprises:
   indicating the direction of adjusting azimuth screw as a AZIM-DIR randomly set at initial state;
   setting the present audio value to START, observing the audio value changed along said AZIM-DIR, indicating an error in adjusting direction, when the audio value is below a START-s and indicating a correction in adjusting direction when the audio value is above a START+s, and changing in direction to restart the adjustment for the azimuth screw with a value for compensating a value heretofore rotated being set to I=-i$_{max}$ when the said azimuth screw is rotated by a constant angle;

adjusting said azimuth screw along the direction correctly set to fine maximum value and determining said maximum value correctly found when the present audio signal reaches to a point below a Max-AUDIO-s; and, turning a direction of adjusting said azimuth screw and finishing said adjusting process when the adjusting value becomes AUDIO-MAX-AUDIO>0.9.

14. The method according to claim 11, wherein said step of adjusting P2 and P3 posts, comprises:

(a) setting P2-DIR and P3-DIR randomly;

(b) reading out a RF-ANAL function and checking whether P2-ERROR and P3-ERROR are set to 0, the adjustment of said P2 and P3 posts being finished when said P2- and P3-ERRORs are 0;

(c) if the P2- and P3-ERRORs are not 0, checking that said P2-ERROR is increased, said P2 post being moved in the P2-DIR direction if the P2-ERROR is not increased, and while said P2 post being moved in a different direction to said P2-DIR direction if P2-ERROR being increased;

(d) checking that said P3-ERROR is increased when the ERRORs is not 0, said P3 post being moved in the P3-DIR direction if the P3-ERROR is not increased, and said P3 post being moved in a direction different to said P3-DIR direction if the P3-ERROR is increased;

(e) repeating said steps (b) to (d);

wherein at said step (c) if said P2-ERROR is 0, then the control is advanced to said step (d) of checking said P3-ERROR.

15. An automatic deck adjusting apparatus having a tape running system adjusting mechanism for adjusting a tape running system of a deck mechanism in a VCR automatically and control means for controlling the adjusting mechanism to adjust the tape running system automatically, said tape running system adjusting mechanism comprising;

a plurality of screw driver tip assemblies for screwing adjustment screws and/or nuts in the system;

a motor assembly for rotating the screw driver tip assemblies by a predetermined angle;

a driver housing for fixedly supporting said screw driver tip assemblies and said motor assembly in place;

a driving means attached to said driver housing for reciprocating said housing;

a positioning means aligning said deck mechanism and said screw driver housing to be coincided in position with each other when they are coupled together; and, a video camera for monitoring the position of said tape passing through guide posts and a position of a lead line of a head drum.

16. An automatic deck adjusting apparatus having a tape running system adjusting mechanism for adjusting a tape running system of a deck mechanism in a VCR automatically and control means for controlling the adjusting mechanism to adjust said tape running system automatically, said tape running system adjusting mechanism comprising:

a plurality of screw driver tip assemblies for screwing adjustment screws and/or nuts in the system;

a motor assembly for rotating the screw driver tip assemblies by a predetermined angle;

a driver housing for fixedly supporting said screw driver tip assemblies and said motor assembly in place;

moving means attached to said driver housing for reciprocating said housing;

a positioning means aligning said deck mechanism and said screw driver housing to be coincided in position with each other when they are coupled together; and, a video camera for monitoring the position of said tape passing through guide posts and a head drum, said control means comprising:

a main computer for controlling entire apparatus;

a motor controller for controlling a motor assembly to rotate multiple driver tip assemblies by a predetermined angle under a control of said main computer;

a position detector for receiving video signals from said video camera monitoring the position of said tape passing through the guide posts and the head drum, calculating the position of said tape on the posts and head drum, and informing the position of said tape to said main computer;

a video signal processor for amplifying and detecting the video signal produced from a video head in the deck, obtaining an envelope waveform from the detected video signal and converting the envelope waveform to digital signal to be transferred to said main computer;

an audio signal processor for calculating an effective value of signal produced by an audio head in said deck and converting said signal into digital signal to be transferred to said main computer; and, a control signal process for holding a peak value of the signal produced by said a control head in said deck, and converting said signal into digital signal to be transferred to said main computer;

wherein said main computer controls said tape running system adjusting mechanism, said motor controller, said positioning detector said video signal processor, said audio signal processor and said control signal processor to adjust said tape running system of said deck.

17. A method of adjusting a tape running system of a deck mechanism in a VCR, the tape running system having a reference surface, a head drum, an audio and control head assembly having a height control nut and an azimuth screw, a capstan and pinch roller pair, and a tape path guide system for guiding a tape from a supply wheel to a take-up wheel, the tape path guide system having:

a tape inlet side limit post P1 located between the supply wheel and the head drum, a tape inlet side slant post P2 located between P1 and the head drum, a tape outlet side slant post P3 located between the head drum and the audio and control head assembly, and a tape outlet side limit post P4 located between the audio and control head assembly and the cupstan and pinch roller pair, using an automatic tape running system adjusting apparatus having a tape running system adjusting mechanism for adjusting a tape running system of a deck mechanism in a VCR automatically, the tape running system adjusting mechanism having a plurality of screw driver tip assemblies having driver top heads for screwing adjustment screws and/or nuts in the tape running system, a motor assembly for rotating the screw driver tip assemblies by a predetermined angle, a driver housing for fixedly supporting the screw driver tip assemblies and the motor assembly in place, moving means attached to the driver housing for reciprocating the housing, a positioning means aligning the deck mechanism and the driver housing to be coincided in position with each other when they are coupled together, and a video camera for monitoring the position of the tape passing through guide posts and a head drum, and control means for controlling the tape running system adjusting mechanism to adjust the tape running system automatically, the control means including a main computer for controlling the tape running system adjusting mechanism, a motor controller for controlling the motor assembly to rotate the multiple driver tip assemblies by a predetermined angle under a control of the main computer, a position detector for receiving video signals from the video camera monitoring the position of the tape passing through the guide posts and the head drum, calculating the position of the tape on the guide posts and head drum, and providing the position of the tape to the main computer, a video signal processor for amplifying and detecting a video signal produced from the head drum of the deck, obtaining an envelope waveform from the detected video signal and converting the envelope waveform to a digital envelope signal to be transferred to the main computer, an audio signal processor for calculating an effective value of a signal produced by the audio head of the deck and converting the signal into a digital audio signal to be transferred to the main computer, and a control signal process for holding a peak value of a signal produced by the control head of the deck, and converting the signal into a digital control signal to be transferred to the main computer, wherein the main computer controls the tape running system adjusting mechanism, the motor controller, the positioning detector, the video signal processor, the audio signal processor and the control signal processor to adjust the tape running system of the deck, the method comprising the steps of:

(a) checking that the deck to be adjusted is at a working area and if the deck is at the working area, moving down the deck adjusting mechanism down to couple it with the deck;

(b) rotating a driver of the plurality of screw driver tip assemblies clockwise or counter-clockwise by 180 degree to conjoin the driver tip head and the screw head or nut;

(c) measuring a height of a lead line of the head drum at 90 degrees of phase to adjust approximately the height of the tape inlet side limit, tape inlet side slant, tape outlet side slant, and tape outlet side limit posts;

(d) measuring a height of a lower side of the tape inlet and outlet side limit posts by using the image of the video camera, comparing the height with the height of the lead line of the head drum at 90 degrees of phase, rotating the tape inlet and outlet side limit posts to be accorded with the lead line height;

(e) measuring a gap between a lower side of the tape at an inlet and an outlet of the head drum and the lead line and adjusting the tape inlet side slant and tape outlet side limit posts so that the gap is to be 0;

(f) adjusting the tape inlet side slant and tape outlet side limit posts such that a linearity LT of the envelope waveform of the video signal taken from video head is larger than an envelope reference value;

(g) adjusting the height control nut of the audio and control head assembly to control a peak value of a control signal produced by the control head to be larger than a control reference value;

(h) adjusting the azimuth screw of the audio and control head assembly so that an effective value RMS of audio signals from the audio head is to be larger than an audio reference value;

(i) measuring each of the envelope, audio, and control signals again after the completion of the process of the steps (a) to (h) and comparing the measured envelope, audio, and control signals with the respective reference value, wherein if the all values of the measured signals satisfy the reference values, then "passed" is indicated; whereas, if the values of the measured signals do not satisfy the reference values, "failure" is indicated.

\* \* \* \* \*